United States Patent
Chen et al.

(10) Patent No.: US 10,714,028 B2
(45) Date of Patent: Jul. 14, 2020

(54) METHODS AND APPARATUS FOR CONTROLLING DISPLAY BACKLIGHT

(71) Applicant: Apple Inc., Cupertino, CA (US)

(72) Inventors: Jingdong Chen, San Jose, CA (US); Asif Hussain, San Jose, CA (US); Mohammad J. Navabi-Shirazi, San Jose, CA (US); Behzad Mohtashemi, Los Gatos, CA (US); Yanhui Xie, Santa Clara, CA (US); Jy Ryoo, Cupertino, CA (US); Ming Gu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/418,882

(22) Filed: May 21, 2019

(65) Prior Publication Data

US 2020/0105185 A1    Apr. 2, 2020

Related U.S. Application Data

(60) Provisional application No. 62/737,686, filed on Sep. 27, 2018.

(51) Int. Cl.
*H02J 1/10* (2006.01)
*H02M 1/00* (2006.01)
(Continued)

(52) U.S. Cl.
CPC .............. *G09G 3/342* (2013.01); *F21S 4/20* (2016.01); *G09G 3/32* (2013.01); *G09G 3/3406* (2013.01);
(Continued)

(58) Field of Classification Search
CPC ....... G09G 3/342; G09G 3/3406; H02M 1/00; H02M 2001/0003; H02M 2001/0048; H02M 3/00–44
See application file for complete search history.

(56) References Cited

U.S. PATENT DOCUMENTS 7,384,126 B2    6/2008  Nakamura et al.
7,828,465 B2   11/2010  Roberge et al.
(Continued)

FOREIGN PATENT DOCUMENTS

EP      2017813 A2    1/2009
WO   2001091427 A2   11/2001
WO   2019090225 A1    5/2019

*Primary Examiner* — Laurence J Lee
(74) *Attorney, Agent, or Firm* — Treyz Law Group, P.C.; Jason Tsai

(57) ABSTRACT

A display may have an array of pixels illuminated using a backlight unit. The backlight unit may include multiple strings of light-emitting diodes (LEDs) and a boost converter for providing an output voltage to the multiple LED strings. The boost converter may have a single-phase single-switch, single-phase multi-switch, and/or multi-phase multi-switch configuration, where the switches are turned off when the peak current is reached. When transitioning from a single phase to a dual phase operation, the second (slave) phase current may be slowly ramped up. When transition from the dual phase to the single phase operation, the output voltage may be elevated while slowing ramping down the slave phase current. The boost converter may include a current detection circuit for adjusting the peak current of each phase to balance the average current levels. The boost converter may also include an in-rush current controller configured to sense a short fault.

20 Claims, 31 Drawing Sheets

(51) Int. Cl.
  *G09G 3/34*   (2006.01)
  *G09G 3/32*   (2016.01)
  *F21S 4/20*   (2016.01)

(52) U.S. Cl.
  CPC ..... *H02J 1/102* (2013.01); *H02M 2001/0009* (2013.01)

(56) References Cited

U.S. PATENT DOCUMENTS

| | | |
|---|---|---|
| 8,629,958 B2 | 1/2014 | Ino et al. |
| 8,680,788 B2 | 3/2014 | Esaki et al. |
| 9,101,001 B2 | 8/2015 | Wagner |
| 9,343,950 B2 | 5/2016 | Kayama |
| 9,500,678 B2 | 11/2016 | Williams |
| 9,578,701 B1 | 2/2017 | Logiudice et al. |
| 9,584,016 B2 | 2/2017 | Motoki |
| 9,693,419 B2 | 6/2017 | Kazikawa |
| 10,098,211 B2 | 10/2018 | Recker et al. |
| 2004/0001040 A1 | 1/2004 | Kardach et al. |
| 2006/0132997 A1* | 6/2006 | Chu .................. H02M 3/156 361/79 |
| 2012/0306386 A1 | 12/2012 | Oshima |
| 2016/0005360 A1 | 1/2016 | Hwang |
| 2017/0212399 A1 | 7/2017 | Tarng et al. |
| 2018/0095576 A1 | 4/2018 | Yokoo et al. |
| 2019/0041008 A1 | 2/2019 | Xiong et al. |
| 2019/0098723 A1 | 3/2019 | Sadwick et al. |
| 2019/0170305 A1 | 6/2019 | Xiong et al. |
| 2019/0197966 A1* | 6/2019 | Hong .................. H02M 1/088 |

* cited by examiner

METHODS AND APPARATUS FOR CONTROLLING DISPLAY BACKLIGHT

This application claims the benefit of provisional patent application No. 62/737,686, filed Sep. 27, 2018, which is hereby incorporated by reference herein in its entirety.

BACKGROUND

This relates generally to electronic devices, and, more particularly, to electronic devices with displays.

Electronic devices often include displays. Backlit displays such as backlit liquid crystal displays include backlight units. A backlight unit produces light that travels outwardly through an array of pixels in a display. The pixels modulate the intensity of the light from the backlight unit to create images on the display.

Backlight units help ensure that displays can display images in a wide variety of ambient lighting conditions. If care is not taken, however, backlight units may produce light that does not efficiently illuminate display pixels or that does not allow the display pixels to exhibit desired levels of color performance.

SUMMARY

A display may have display layers that include a liquid crystal layer, a color filter layer, and a thin-film transistor layer and may also include a backlight unit configured to illuminate the display layers. In one suitable arrangement, the backlight unit may include a plurality of light-emitting diode (LED) strings, a first backlight driver integrated circuit configured to drive a first subset of LED strings in the plurality of LED strings, and a second backlight driver integrated circuit configured to drive a second subset of LED strings in the plurality of LED strings. The first and second backlight driver integrated circuits are configured to receive a common synchronization signal for ensuring that first and second pulse-width modulated signals generated by the first and second backlight driver integrated circuits exhibit the same frequency. The first and second backlight driver integrated circuits may also receive an enable signal that sets a predetermined phase delay between the first and second pulse-width modulated signals generated by the first and second backlight driver integrated circuits.

In accordance with another suitable arrangement, the display may further include a current driver circuit coupled to the plurality of LED strings, where the current driver circuit is configured to throttle the maximum brightness of the backlight unit when at least one LED string in the plurality of LED strings is faulty. The backlight unit may include a fault detection circuit configured to detect a number of faulty LED strings in the plurality of LED strings. The amount by which the current driver circuit throttles the maximum brightness of the backlight unit is a function of the number of fault LED strings determined by the fault detection circuit (e.g., the amount by which the current driver circuit throttles the maximum brightness of the backlight unit is a function of the product of the number of faulty LED strings and a throttling coefficient). The throttling coefficient may be a programmable value in the range of 5% to 20%.

In accordance with another suitable arrangement, the backlight unit may further include a DC-to-DC converter configured to provide an output voltage to the plurality of LED strings and a headroom feedforward control circuit configured to receive a brightness command. In particular, the headroom feedforward control circuit directs the DC-to-DC converter to adjust the output voltage by a predictive amount responsive to detecting a change in the brightness command. The predicted amount may be computed using a linear or non-linear equation that is a function of the brightness command.

In accordance with yet another suitable arrangement, the DC-to-DC converter may be a boost converter that includes an input port that receives an input voltage, an output port on which an output voltage is generated, a first inductor coupled between the input port and the output port, a first switch and a first current sensing resistor coupled in series between the first inductor and the ground line, and a controller configured to receive a first sensing signal from the first current sensing resistor and to selectively turn off the first switch in response to detecting that the amount of current flowing through the first switch exceeds a predetermined peak current level.

The boost converter may further include a second inductor coupled between the input and output port, a second switch and a second current sensing resistor couple in series between the second inductor and the ground line. In particular, the boost converter may be operable in a single-phase mode during which only the first switch is turned on and in a dual-phase mode during which both the first and second switches are turn on. The controller may raise the output voltage when down-transitioning from the dual-phase mode to the single-phase mode to compensate for a voltage dip during the down transition. The controller may ramp up the amount of current flowing through the second switch when up-transitioning from the single-phase mode to the dual-phase mode to reduce a voltage overshoot during the up transition.

In accordance with another suitable arrangement, the controller in the boost converter is configured to balance the average amount of current flowing through the first and second switches during the dual-phase mode to reduce power loss in the converter. The controller may include peak current adjustment circuitry for adjusting the amount of current flowing through at least one of the first switch and the second switch. The peak current adjustment circuitry may include a first current detection circuit configured to receive a first sensing signal from the first current sensing resistor and to output a first amount of detected current, a second current detection circuit configured to receive a second sensing signal from the second current sensing resistor and to output a second amount of detected current, and a peak current adjustment circuit configured to receive the first amount of detected current and the second amount of detected current and to output a first adjustment signal for adjusting the amount of current flowing through the first switch and a second adjustment signal for adjusting the amount of current flowing through the second switch.

In accordance with yet another suitable arrangement, the boost converter may be provided with an in-rush current controller interposed between the input port and the inductor. The in-rush current controller may include a transistor having a drain terminal connected to the inductor, a gate terminal, and a source terminal connected to the input port. The in-rush current controller may further include a detection resistor coupled between the gate terminal and source terminal of the transistor and comparison circuitry configured to receive a sensing signal from the detection resistor to determine whether a short fault is present in the converter circuit.

DETAILED DESCRIPTION

Figure 1:
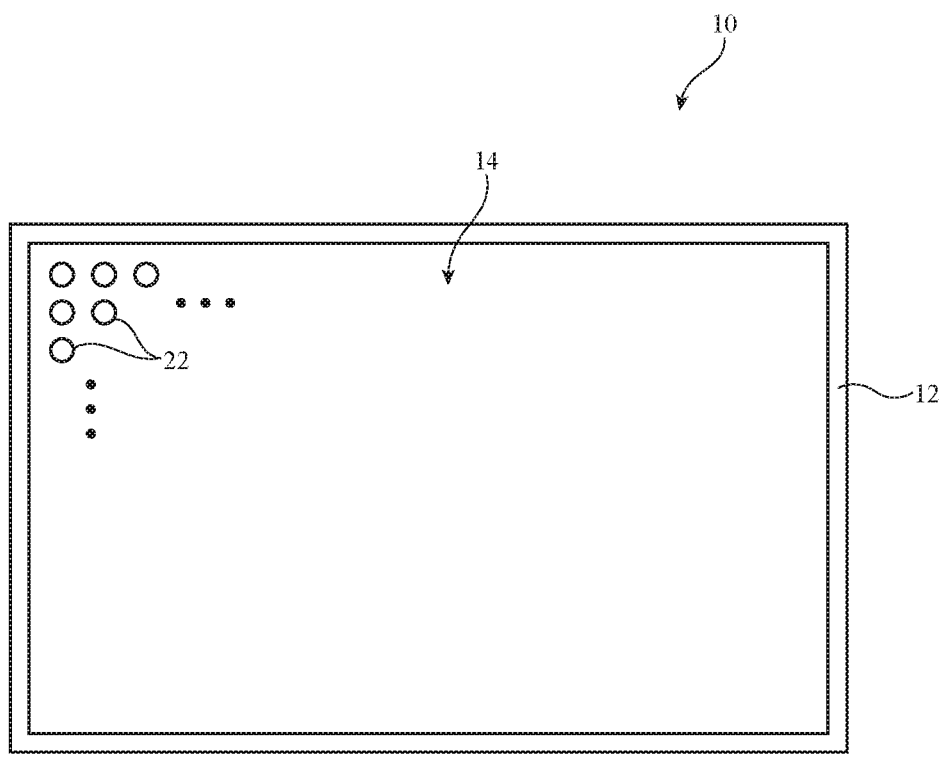
FIG. 1 is a diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a computer display that does not contain an embedded computer, a computer display that includes an embedded computer, a gaming device, a navigation device, an embedded system such as a system in which electronic equipment with a display is mounted in a kiosk or automobile, equipment that implements the functionality of two or more of these devices, or other electronic equipment.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. A touch sensor may be formed using electrodes or other structures on a display layer that contains a pixel array or on a separate touch panel layer that is attached to the pixel array (e.g., using adhesive).

Display 14 may include an array of pixels 22. The array of pixels 22 in display 14 may form a rectangular area or an area of other suitable shapes for displaying images for a user. Pixels 22 may be formed from liquid crystal display (LCD) components, an array of electrophoretic pixels, an array of electrowetting pixels, or pixels based on other display technologies. Configurations in which display 14 is a liquid crystal display that is illuminated by a light source are sometimes described herein as an example. Liquid crystal display pixels for display 14 may have any suitable switching configuration (e.g., fringe-field switching, vertical alignment, twisted nematic, in-plane switching, etc.). Fringe-field switching displays may exhibit reduced sensitivity to touch. Twisted neumatic designs may be helpful in arrangements in which blue light is being modulated, because the retardation of liquid crystal material tends to be greater at short wavelengths. The use of liquid crystal display technology for forming display 14 is merely illustrative. Display 14 may, in general, be formed using any suitable type of pixels.

Display 14 may be protected using a display cover layer such as a layer of transparent glass or clear plastic. Openings may be formed in the display cover layer. For example, an opening may be formed in the display cover layer to accommodate a button, a speaker port, or other component. Openings may be formed in housing 12 to form communications ports (e.g., an audio jack port, a digital data port, etc.), to form openings for buttons, etc. In some arrangements, the display cover layer for display 14 is free of openings and/or housing 12 is free of openings for buttons, etc.

Figure 2:
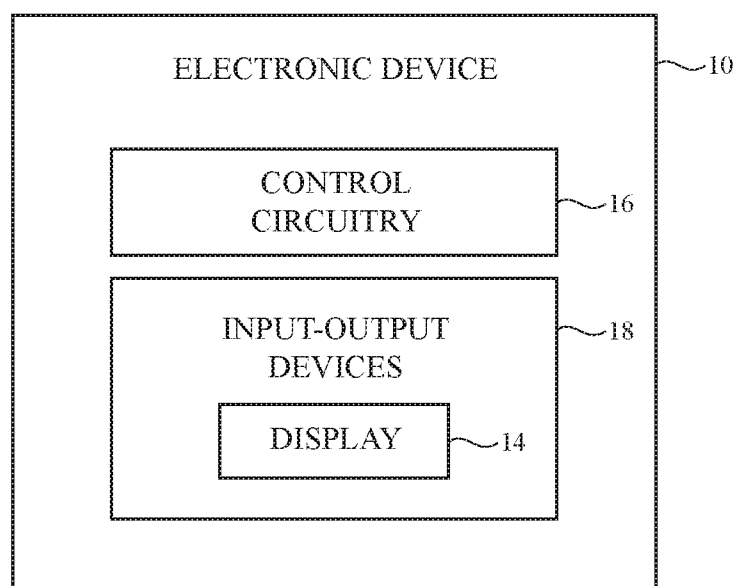
FIG. 2 is a schematic diagram of an illustrative electronic device having a display in accordance with an embodiment.

FIG. 2 is a schematic diagram of device 10. As shown in FIG. 2, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 18 may be used to allow data to be supplied to device 10 and to allow data to be provided from device 10 to external devices. Input-output devices 18 may include buttons, joysticks, scrolling wheels, touch pads, key pads, keyboards, microphones, speakers, tone generators, vibrators, cameras, sensors (e.g., ambient light sensors, proximity sensors, orientation sensors, magnetic sensors, force sensors, touch sensors, pressure sensors, fingerprint sensors, etc.), light-emitting diodes and other status indicators, data ports, etc. A user can control the operation of device 10 by supplying commands through input-output devices 18 and may receive status information and other output from device 10 using the output resources of input-output devices 18. Input-output devices 18 may include one or more displays such as display 14.

Control circuitry 16 may be used to run software on device 10 such as operating system code and applications. During operation of device 10, the software running on control circuitry 16 may display images on display 14 using an array of pixels in display 14. While displaying images, control circuitry 16 may control the transmission of each of the pixels in the array and can make adjustments to the amount of illumination for the pixel array that is being produced by light source structures in display 14.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 3:
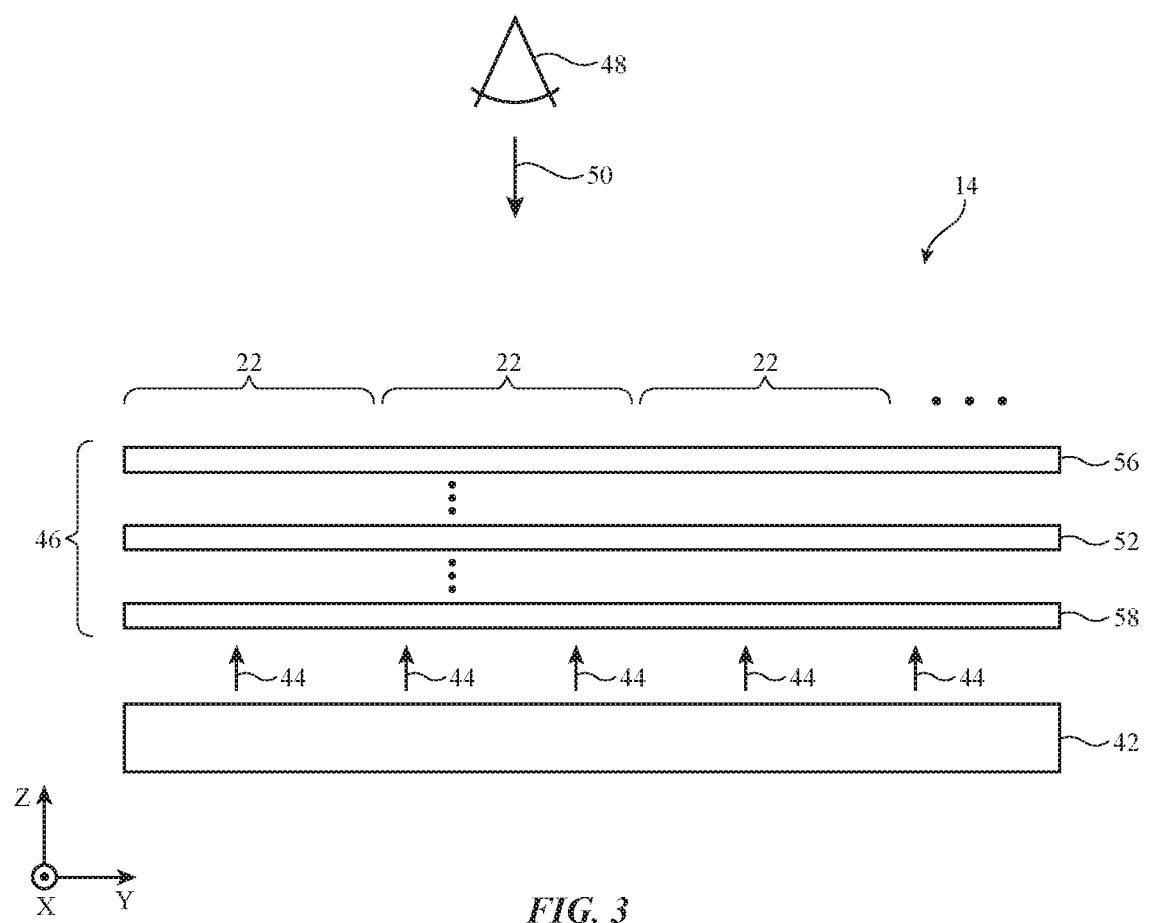
FIG. 3 is a cross-sectional side view of an illustrative display in accordance with an embodiment.

A cross-sectional side view of display 14 is shown in FIG. 3. As shown in FIG. 3, display 14 may include a light source such as light source 42. Light source 42 (sometimes referred to as a backlight unit) is configured to output light 44, which serves as backlight illumination for display 14.

As shown in FIG. 3, light 44 travels outwards (vertically upwards in dimension Z in the orientation of FIG. 3) away from backlight unit 42 and is received by pixels 22 in display layers 46. Light 44 passes through transparent structures in pixels 22 and/or appropriately colored filter elements. In this way, light 44 may help illuminate images on the pixel array formed from pixels 22 in display layers 46 so that these images may be viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a liquid crystal display, display layers 46 may include a liquid crystal layer such a liquid crystal layer 52. Liquid crystal layer 52 may be sandwiched between display layers such as display layers 58 and 56. Display 14 may also include polarizers. The polarizers may be formed from external polarizer layers (e.g., polarizer layers on the surfaces of layers 56 and 58 that face away from liquid crystal layer 52) and/or from in-cell polarizers (polarizers facing liquid crystal layer 52).

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, lower layer 58 may be a thin-film transistor layer that includes an array of pixel circuits based on thin-film transistors and associated electrodes (pixel electrodes) for applying electric fields to liquid crystal layer 52 and thereby displaying images on display 14. Upper layer 56 may be a layer that includes an array of colored pixel elements (e.g., color filter elements and/or colored quantum dot elements) for providing display 14 with the ability to display color images. If desired, the lower layer of display 14 may be a layer that includes an array of colored elements (e.g., color filter elements and/or colored quantum dot elements) and the upper layer of display 14 may be a thin-film transistor layer. Configurations in which an array of colored elements (e.g., color filter elements and/or colored quantum dot elements) are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to pixels 22 using display driver circuitry (e.g., one or more display driver integrated circuits and/or thin-film transistor circuitry) while light source 42 is providing light 44 to pixels 22.

It may be desirable to limit the angular spread of the light from pixels 22 to enhance display efficiency. Configurations in which light source 42 produces polarized light may also be helpful in enhancing display efficiency (e.g., polarizer losses can be reduced).

Figure 4A:
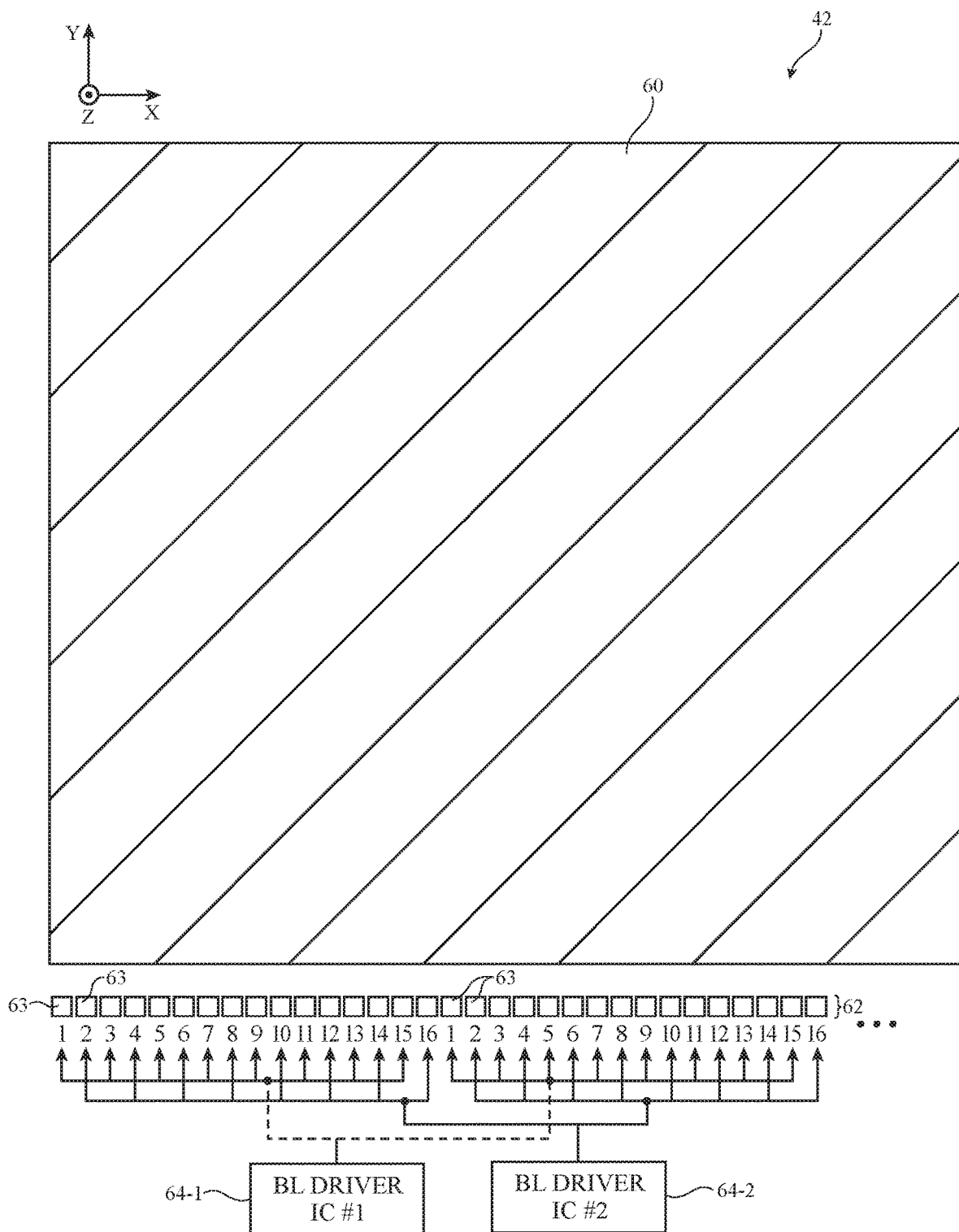
FIG. 4A is a top layout view of an illustrative backlight unit controlled using two separate driver integrated circuit chips configured to drive interleaving light-emitting diode (LED) strings in accordance with an embodiment.

FIG. 4A is a top layout view of an illustrative backlight unit 42 controlled using two separate driver integrated circuit chips. Backlight unit 42 (which may sometimes be referred to as a backlight, backlight layers, backlight structures, a backlight module, a backlight system, etc.) may be used in producing backlight illumination 44 that passes through display layers 46 (FIG. 3). Backlight unit 42 may have optical films, a light diffuser layer, and associated light-emitting diode (LED) elements 62. Light-emitting diode elements 62 may contain a one-dimensional or two-dimensional array of light sources such as light-emitting diodes that produce backlight illumination 44. The light produced by LED structures 62 may travel upwardly along dimension Z through the light diffuser and optical films (shown collectively as layers 60) before passing through display pixels 22. Light diffuser 60 may contain light-scattering structures that diffuse the light from light-emitting diode elements 62 and thereby help provide uniform backlight illumination 44. Optical films 60 may include films such as a dichroic filter, a phosphor layer, a microlens array layer, and additional films (e.g., brightness enhancement films that help to collimate light 44 and thereby enhance the brightness of display 14 for user 20 and/or other optical compensation films).

Light-emitting diode elements 62 within backlight unit 42 is typically controlled using a single backlight driver integrated circuit chip. This conventional approach in which all the LED current drivers are integrated onto a single chip can provide the advantages of current matching, current sloping control, lower cost, and a compact size. However, when supporting larger-sized displays such as 20+ inch displays or 30+ inch displays and beyond, the integrated single-chip solution would risk encountering problems with thermal management (i.e., a single backlight driver chip driving a large LED structure might consume too much power and produce too much heat).

In accordance with an embodiment, the backlight LEDs may be driven using more than one backlight driver integrated circuit. Using multiple parallel backlight drivers might be technically advantageous from a scalability standpoint to provide extended LED driving capability for larger displays without having to develop new integrated circuit designs. In other words, using multiple backlight drivers can help greater shorten development time and lower development risk.

As shown in FIG. 4A, backlight LED elements 62 may be driven by a first backlight driver integrated circuit (IC) chip 64-1 and a second backlight driver integrated circuit (IC) chip 64-2. In the example of FIG. 4A, LED elements 62 include sixteen separate groups of LEDs, each of which may be referred to herein as an LED string. Each individual LED 63 corresponding to indices "1" in FIG. 4A belongs to a first LED string (i.e., "String1"); each LED element 63 corresponding to indices "2" belongs to a second LED string (i.e., "String2"); each LED element 63 corresponding to indices "3" belongs to a third LED string (i.e., "String3"); and so on up to the last LED string (i.e., "String16"). Each LED string may include ten individual LEDs, fewer than ten LEDs, 10-20 LEDs, more than 20 LEDs, or any suitable number of light-emitting diodes connected in series or in a chain. This example in which backlight unit 42 includes 16 LED strings is merely illustrative. If desired, backlight unit 42 may be provided with fewer than 16 LED strings or more than 16 LED strings.

Figure 4B:
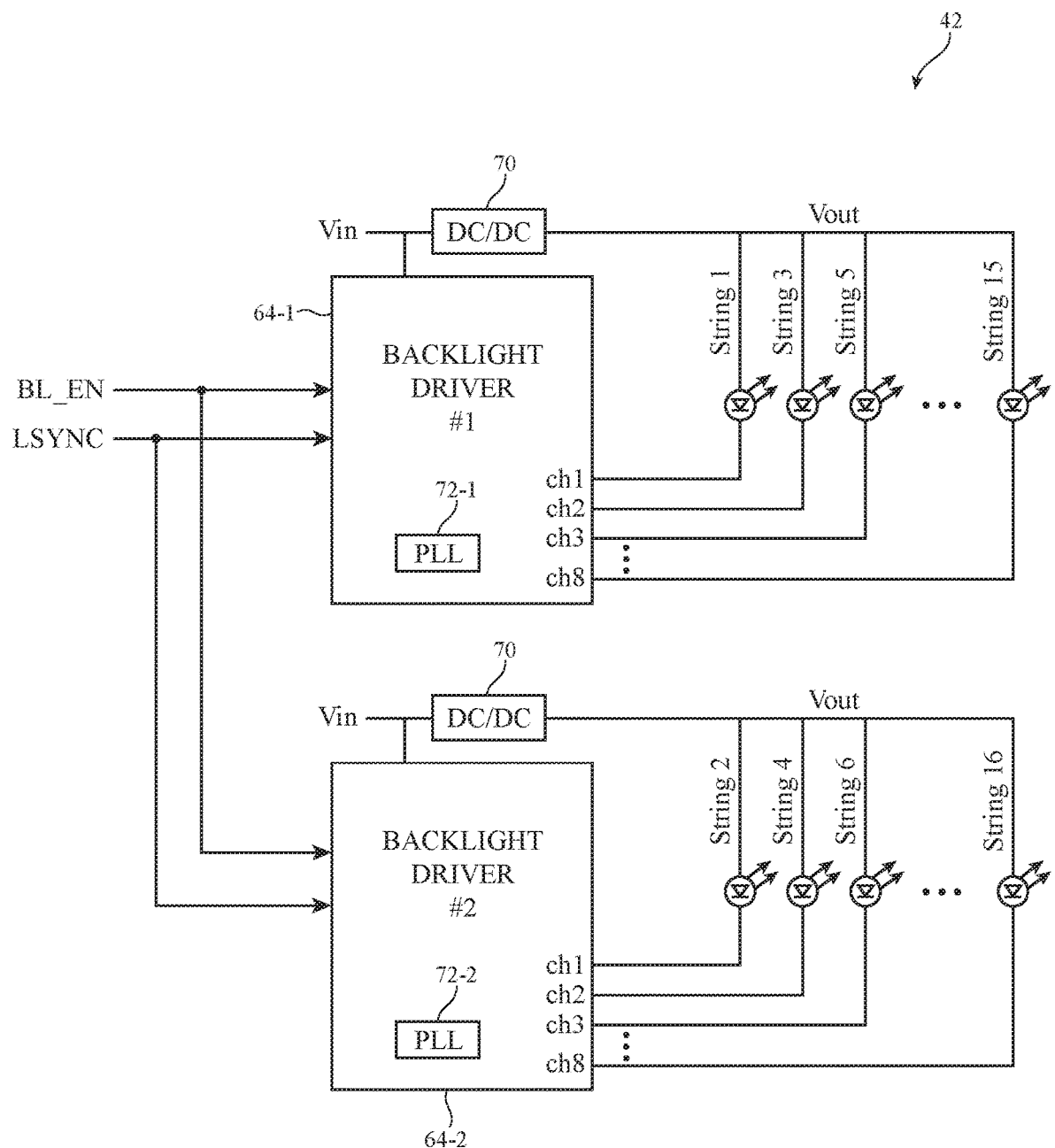
FIG. 4B is a schematic diagram showing how the two backlight driver integrated circuit chips shown in FIG. 4A can be used to drive respective LED strings in accordance with an embodiment.

FIG. 4B is a schematic diagram showing how the two backlight driver integrated circuit chips 64-1 and 64-2 can be used to drive respective LED strings. Each of drivers 64-1 and 64-2 may receive an input voltage Vin, which is fed to an electric power conversion circuit such as a DC-to-DC converter 70. DC/DC converter 70 may be configured to convert a source of direct current (DC) from one voltage level to another voltage level. Converter 70 may be a step-up or boost converter (e.g., DC/DC converter 70 may generate a corresponding Vout that is greater than Vin) or may be a step-down or buck converter (e.g., DC/DC converter 70 may generate a corresponding Vout that is less than Vin). Output voltage Vout generated by converter 70 may be used to power the different LED strings coupled to that backlight driver circuit.

As shown in FIG. 4A and FIG. 4B, all odd numbered LED strings (i.e., String1, String3, String5, String7, etc.) may be driven using first backlight driver IC 64-1 (as shown by the dotted connection in FIG. 4A for clarity), whereas all even numbered LED strings (i.e., String2, String4, String6, String8, etc.) may be driven using second backlight driver IC 64-2. In other words, each of the two backlight driver ICs is configured to drive eight separate LED strings in an "interleaved" fashion. The term "LED channel" used herein is synonymous with "LED string." Note that the first channel (Ch1) of backlight driver 64-1 is coupled to String1 while Ch1 of backlight driver 64-2 is coupled to String2. The second channel (Ch2) of backlight driver 64-1 corresponds to String3 while Ch2 of backlight driver 64-2 corresponds to String4. The last channel (e.g., Ch8) of backlight driver 64-1 is connected to String15 while Ch8 of backlight driver 64-2 is connected to String16.

One challenge for implementing multiple backlight driver ICs is managing the LED channel phase shift from IC to IC. Reference to phase shift among different LED channels may refer to the amount of phase delay among the control signals modulating the various LED strings. Each LED string may receive a respective pulse-width modulated (PWM) signal from the backlight driver circuit. The PWM signals are clock signals having an adjustable pulse width. In other words, the duty cycle of the PWM signals can be modulated to control the period of time during which each LED string is turned on.

The PWM signals output from backlight driver 64-1 may be generated using a first phase-locked loop (PLL) circuit 72-1 within driver 64-1, whereas the PWM signals output from backlight driver 64-2 may be generated using a second PLL circuit 72-2 within driver 64-2. Both PLL circuits 72-1 and 72-2 generate PWM signals from a common synchronization input signal LSYNC, so the frequency of the PWM signals generated by the two PLLs are the same and their phase relation may be fixed after powerup. The two backlight drivers 64-1 and 64-2 may, however, exhibit different startup behavior such as varying PLL lock times. If the PLL lock times are different, then the LED strings driven by the two different backlight driver ICs will exhibit a fixed but unknown phase relationship after startup. This unknown channel phase shift between the multiple backlight driver chips can introduce undesirable front-of-screen artifacts on display 14.

Figure 4C:
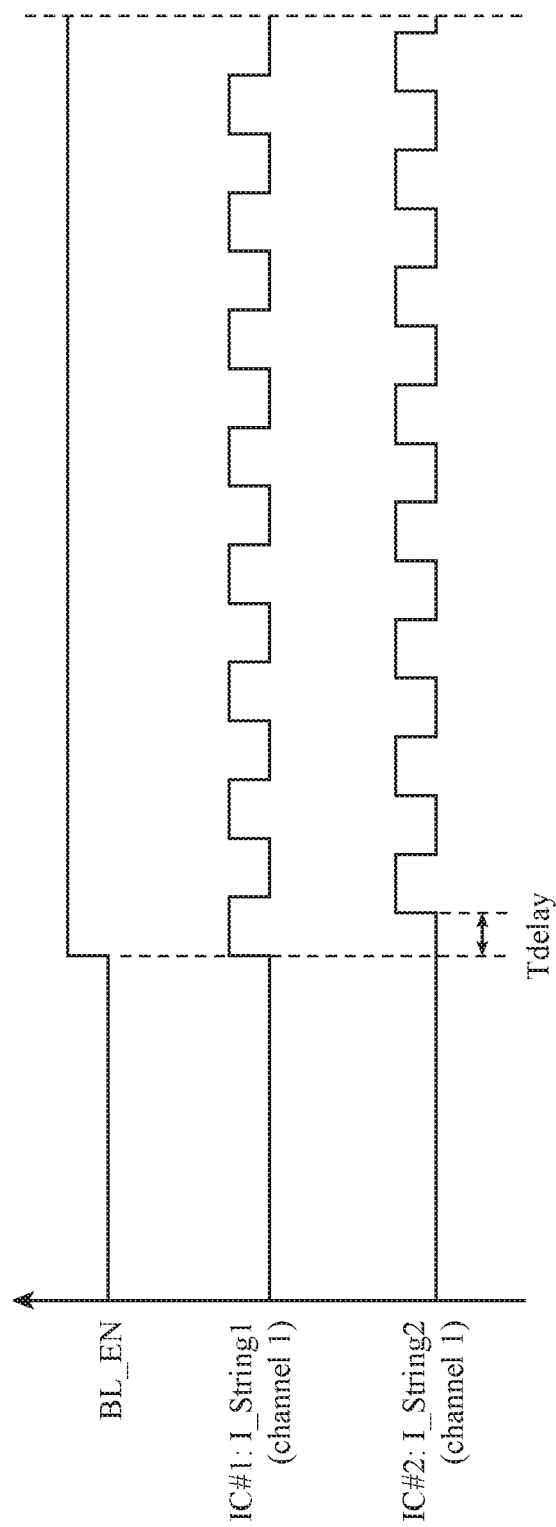
FIG. 4C is a timing diagram showing how a backlight enable signal can be used as a synchronization signal for phase locking, where channels associated with the second backlight driver are phase-delayed with respect to channels associated with the first backlight driver in accordance with an embodiment.

To solve the unknown phase relation among the various LED channels driven by the different backlight driver ICs, a backlight enable signal BL_EN may be used as a synchronization signal for the purposes of phase locking. As shown in FIG. 4B, backlight enable signal BL_EN may be provided to both backlight drivers 64-1 and 64-2. FIG. 4C is a timing diagram showing how backlight enable signal BL_EN can be used as a synchronization signal for phase locking.

As shown in FIG. 4C, when signal BL_EN is asserted (e.g., when BL_EN is driven from low to high), the PWM signal for channel 1 of the first backlight driver 64-1 will start immediately (e.g., a pulse-width modulated current will start flowing through String1). Thereafter, second backlight driver 64-2 will use PLL 72-2 to time a desired delay (see Tdelay in FIG. 4C) such that channel 1 of the second backlight driver 64-2 will start with the correct phase delay/offset. In this example where backlight unit 42 includes a total of sixteen LED strings, the channels associated with first backlight driver 64-1 may exhibit the following phase relationships:

Channel 1 (String1): 0 degree
Channel 2 (String3): 45 degree
Channel 3 (String5): 90 degree
. . .
Channel 8 (String15): 315 degree Similarly, the channels associated with second backlight driver 64-2 may exhibit the following phase relationships:

Channel 1 (String2): 22.5 degree
Channel 2 (String4): 67.5 degree
Channel 3 (String6): 112.5 degree
. . .
Channel 8 (String18): 337.5 degree Here, the 22.5° phase delay between channel 1 of the two backlight driver ICs is determined by dividing 360 by the number of total LED strings (e.g., 360/16=22.5), which can be created using a 160 kHz LSYNC clock, a 40 MHz PLL clock, a 20 kHz LED PWM frequency, and a 25 µs Tdelay (as an example).

The example of FIGS. 4A-4C in which the backlight LEDs are driven using two backlight driver IC chips is merely illustrative and is not intended to limit the scope of the present embodiments. If desired, more than two parallel display backlight driver chips (e.g., three or more driver circuits, four or more driver circuits, 4-10 driver circuits, 10 or more driver circuits, etc.) can be used to drive any number of LED strings/channels in the backlight unit, where the phase delay among the various driver chips can be adjusted appropriately to achieve the desired timing relationship.

Figure 4D:
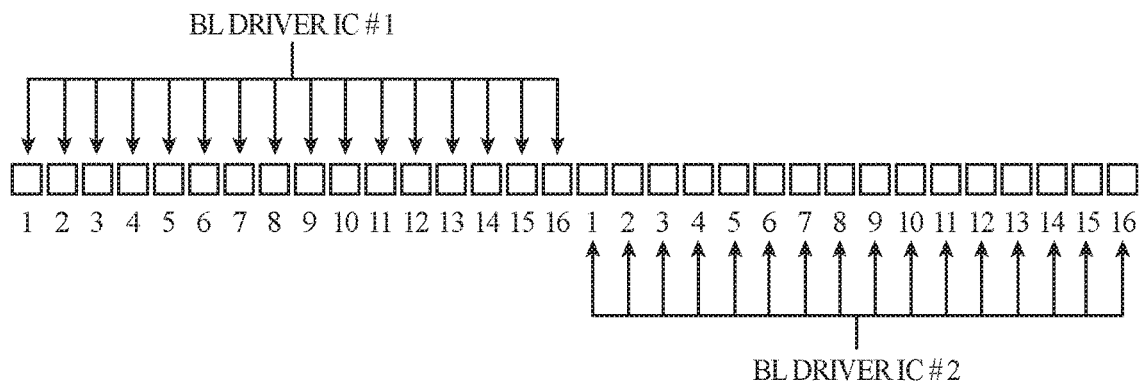
FIG. 4D is a diagram showing another illustrative light bar arrangement in which a first half of the light bar is controlled by a first backlight driver and a second half of the light bar is controlled by a second backlight driver in accordance with an embodiment.
Figure 4E:
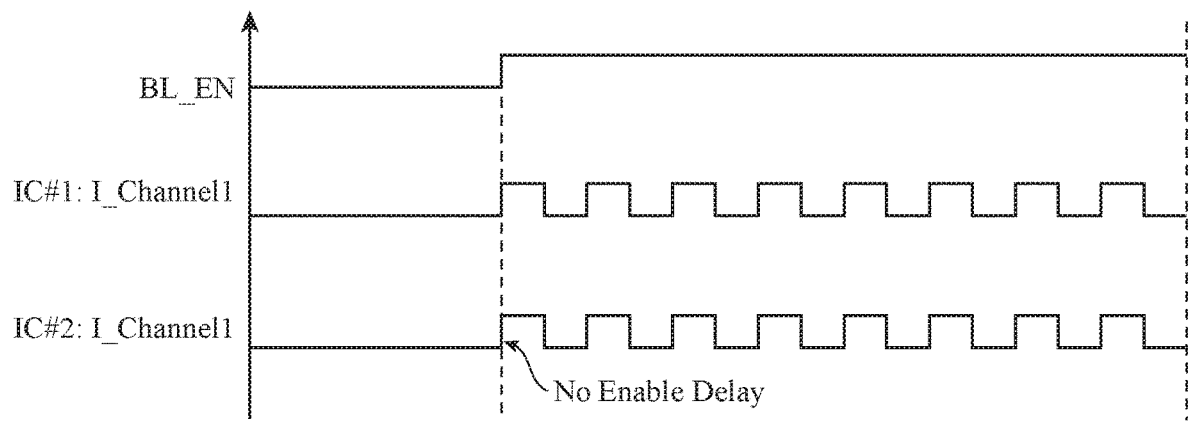
FIG. 4E is a timing diagram showing how a backlight enable signal can be used as a synchronization signal for phase locking, where channels associated with the first and second backlight drivers both start at the rising edge of the backlight enable signal in accordance with an embodiment.

The configuration of FIG. 4A in which the backlight LED elements are controlled by driver circuits 64-1 and 64-2 in an interleaving fashion (e.g., where adjacent LED elements are driven by different backlight driver chips in an alternating manner) is merely exemplary. FIG. 4D shows another illustrative light bar arrangement in which a first half of the LED strings are driven by a first backlight driver chip and a second half of the LED strings are driven by a second backlight driver chip. Here, the two backlight driver ICs can also be controlled by a common enable signal BL_EN. FIG. 4E is a timing diagram showing how backlight enable signal BL_EN can be used as a synchronization signal for phase locking for this non-interleaved arrangement.

As shown in FIG. 4E, when signal BL_EN is asserted, the PWM signal for channel 1 of both driver ICs will start at the same time. In other words, the rising edge of enable signal BL_EN will trigger the PWM signals for both drivers, and no phase offset is needed between the two driver ICs. Assuming backlight unit 42 includes a total of sixteen LED strings, the channels associated with both driver IC chips may exhibit the following phase relationships:

Channel 1: 0 degree
Channel 2: 45 degree
Channel 3: 90 degree
Channel 8: 315 degree The example of FIGS. 4D-4E in which the backlight LEDs are driven using two backlight driver IC chips is merely illustrative and is not intended to limit the scope of the present embodiments. If desired, more than two parallel display backlight driver chips (e.g., three or more driver circuits, four or more driver circuits, 4-10 driver circuits, 10 or more driver circuits, etc.) can be used to drive any number of LED strings/channels in the backlight unit, where all driver circuits start at the same time at the rising edge of enable signal BL_EN.

The methods described above where the channel-to-channel phase relationship between multiple backlight driver IC chips is set using a backlight enable signal and optionally a predetermined delay time may impose several technical requirements. As an example, the approaches described in connection with FIGS. 4A-4E may require all LED strings to be fault-free. Thus, if there is any defective LED string, the proposed synchronization scheme may not operate properly. As another example, proper synchronization of the two backlight driver ICs may also require receipt of the externally supplied LSYNC signal (see FIG. 4B). If signal LSYNC is missing, the PWM clock signals generated by the various PLL circuits (e.g., PLLs 72-1 and 72-2) may not be able to lock to the same reference clock signal.

As described above, the various LED strings in the backlight unit may be driven using one or more backlight driver ICs. Ideally, all LED strings are perfectly functional (i.e., there are no defective backlight LED elements). In practice, however, even a single faulty LED in a given string will render that entire LED string defective. The amount of current that needs to be produced by a backlight driver may vary depending on the number of faulty LED strings. It may therefore be desirable to provide a mechanism for detecting the number of faulty LED strings within the backlight unit.

Figure 5A:
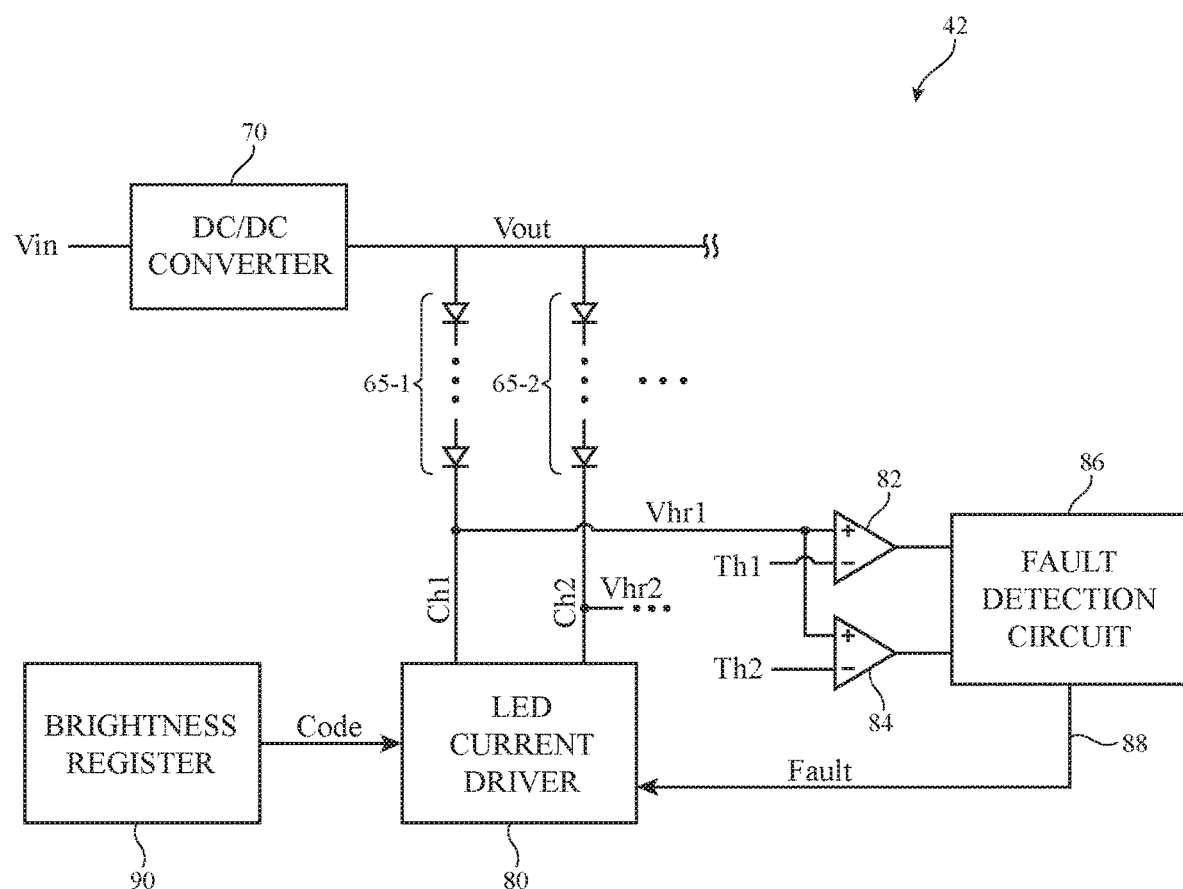
FIG. 5A is a diagram of illustrative backlight driver circuitry that includes a fault detection circuit in accordance with an embodiment.

FIG. 5A is a diagram of illustrative backlight driver circuitry that includes a fault detection circuit in accordance with an embodiment. As shown in FIG. 5A, backlight unit 42 may include a DC/DC converter 70 that receives an input voltage and generates a corresponding output voltage Vout for a plurality of LED strings (e.g., a first LED string 65-1 associated with a first channel Ch1, a second LED string 65-2 associated with a second channel Ch2, and so on), an LED current driver circuit 80 configured to provide current (e.g., a pulse-width modulated current signal) for each of the LED channels connected to that driver 80, and a brightness register 90 configured to store and output a brightness code to LED current driver 80. The brightness code (sometimes referred to as a brightness command, an externally-supplied brightness setting, or a user-supplied brightness setting) may control the duty cycle of the PWM current signals for the various LED channels and may therefore be used to adjust the overall brightness of backlight unit 42.

The voltage at the node connecting each LED string to current driver 80 may be referred to as a headroom voltage. In the example of FIG. 5, first LED string 65-1 produces a first headroom voltage Vhr1, whereas second LED string 65-2 produces a second headroom voltage Vhr2. Each LED channel will have its own respective headroom voltage VhrX. In general, the headroom voltages of all associated LED strings are sensed and adjusted to help maintain a sufficient headroom margin so that LED current driver 80 is able to deliver the desired target current. In general, the headroom voltage should not be too high to avoid excessive headroom power loss.

In certain arrangements, the headroom voltages may also be used for fault detection purposes. As shown in FIG. 5A, the LED current driver 80 may also be provided with an associated LED fault detector such as fault detection circuit 86. Consider a scenario where the nominal Vhr range is about 500 mV. If there is a single LED fault in the first string 65-1 (i.e., if one of the LEDs in the first channel is shorted out), then headroom voltage Vhr1 might increase by a single LED forward voltage Vf, which can be 3 to 4 V (as an example). If there are two LED faults in the first string 65-1 (i.e., if any two of the LEDs in the first channel are shorted out), then headroom voltage Vhr1 might increase by 2*Vf, which can be 6 to 8 V (as an example).

Headroom voltage Vhr1 may be compared to one or more thresholds to determine whether there is a single LED short or multiple LED shorts in that string. In the example of FIG. 5A, headroom voltage Vhr1 may be compared to a first threshold voltage Th1 using a first comparator 82 and may also be compared to a second threshold voltage Th2 using a second comparator 84. If the output of both comparators 82 and 84 are low, then there is no fault in LED string 65-1. If only the output of comparator 82 is high, then a single LED fault is detected in that string. It the outputs of both comparators 82 and 84 are high, then at least two LED faults have been detected in that channel. To compute the headroom power loss of each LED string, the headroom voltage is multiplied with the string current (ICED). Thus, when there is a single LED short in the string in the example above, the headroom loss will increase from $(500\ mV)*I_{LED}$ to $(500\ mV+Vf)*I_{LED}$. Assuming the string current ICED is 100 mA and LED forward voltage Vf is 4 V, then the headroom power loss increases substantially from 50 mW to 450 mW. The headroom power loss will be even greater as the number of faulty LEDs in a given string increases (i.e., when there are two or more LED shorts in a given channel).

The excessive headroom power loss introduced by LED shorts/faults may cause LED driver thermal runaway if it is not handled properly. One way of handling LED short faults is to simply turn off the LED string if an LED short has been detected. Turning on a faulty LED string may, however, result in noticeable brightness non-uniformity to the end user. Another way of handling LED short faults is to over design the thermal solution of the backlight unit to accommodate for faulty conditions. Over designing the thermal solution may, however, be overly conservative since the probability of having LED shorts is generally fairly low.

Figure 5B:
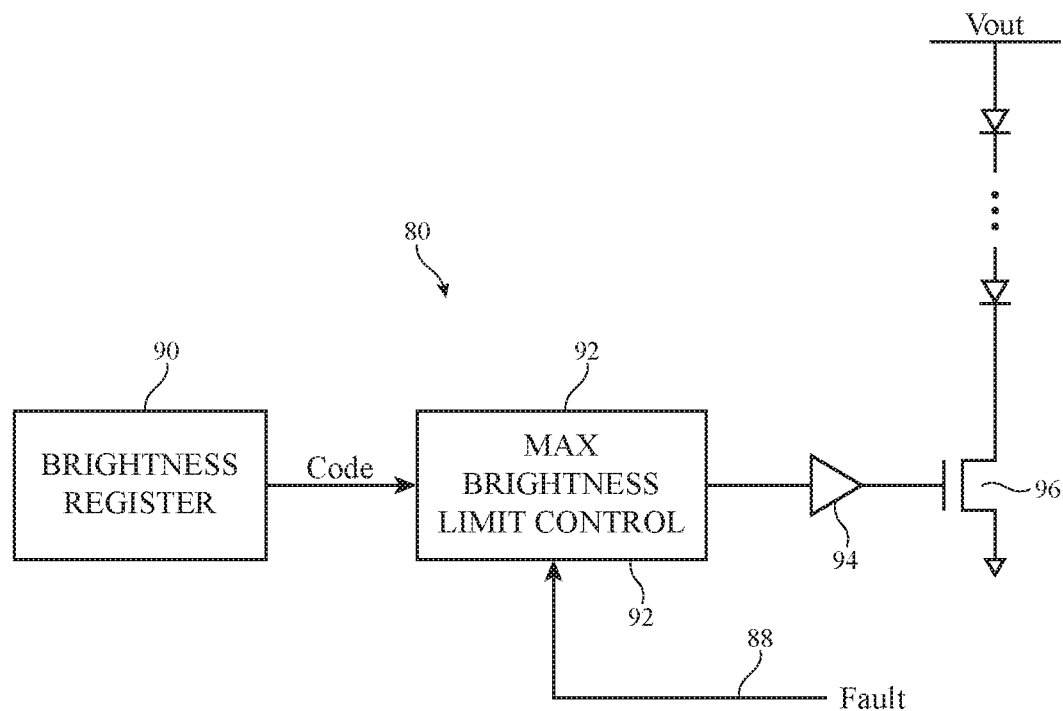
FIG. 5B is a diagram showing how an illustrative LED current driver may include a maximum brightness control circuit in accordance with an embodiment.

In accordance with an embodiment, a global brightness throttling method is provided to handle an LED short fault without having to turn off a defective LED string and without having to overdesign the thermal solution. This method may only allow a single LED short in any given string. In particular, fault detection circuit 86 may be configured to output a fault signal on feedback path 88. The fault signal may include information about the number of LED strings with a single LED short fault. FIG. 5B is a diagram showing how LED current driver 80 may include a maximum brightness limit control circuit 92. Maximum brightness limit control circuit 92 may receive the brightness command from brightness register 90, may receive the fault information from fault detection circuit 86 via path 88, and may output a corresponding adjusted maximum brightness setting to current output driver 94, which controls the current sink switch 96 for that LED string.

The maximum brightness limit control circuit 92 may limit the maximum display brightness setting as follows:

$$B\text{max\_adj}=B\text{max\_def}*(1-N*K\_\text{throttle}) \quad (1)$$

where Bmax_adj is the dynamically adjusted maximum brightness that can be output from control circuit 92, where Bmax_def is the default maximum brightness level (e.g., 100%), where N is the total number of faulty LED strings as determined by fault detection circuit 86, and where K_throttle is the throttling coefficient. The throttling coefficient K_throttle may be a programmable parameter ranging from 5 to 20% or more.

Figure 5C:
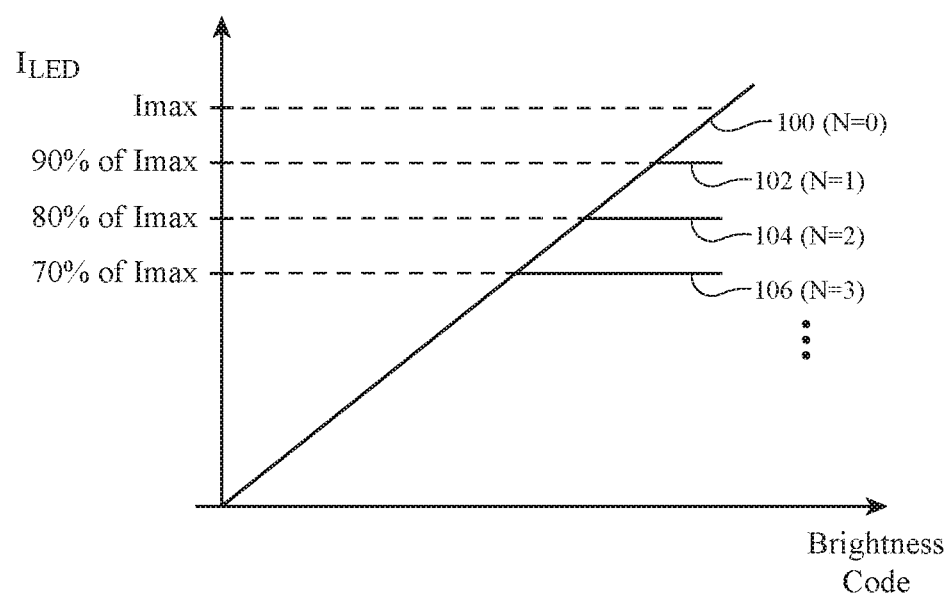
FIG. 5C is a plot illustrating how the LED current can be limited depending on the number of faults detected in accordance with an embodiment.

FIG. 5C is a plot illustrating how the string current $I_{LED}$ can be limited depending on the number of faulty channels detected. Trace 100 represents the non-defective scenario (N=0) where the brightness code is able to achieve the maximum drive current level Imax. Trace 102 represents another scenario where one LED string exhibits a short fault (N=1), so the maximum brightness is limited to only 90% of the default maximum level. Trace 104 represents yet another scenario where two LED strings exhibit a short fault (N=2), so the maximum brightness will be limited to only 80% of the default maximum level. Trace 106 represents yet another scenario where three LED strings exhibit a short fault (N=3), so the maximum brightness will be limited to only 70% of the default maximum level.

The example of FIG. 5C illustrates a K_throttle of 10% (since the maximum brightness level is adjusted by intervals of 10% as N increments) but this is merely illustrative. If desired, throttle coefficient K_throttle might be set to 5%, to 7.5%, to 10%, to 12.5%, to 15%, or to any suitable level between 1-20% to globally adjust the maximum brightness under a detected fault condition. Configured and operated in this way, brightness uniformity across the display is maintained, and there is no need to overdesign the thermal solution. Adjusting the maximum global brightness when there is a fault (when N is not equal to zero) would make the display dimmer if the user sets the brightness to the maximum (i.e., when the brightness code/command is set by the user to the maximum value). However, if the user does not set the brightness to the maximum level, there will be little to no noticeable brightness change.

Figure 6A:
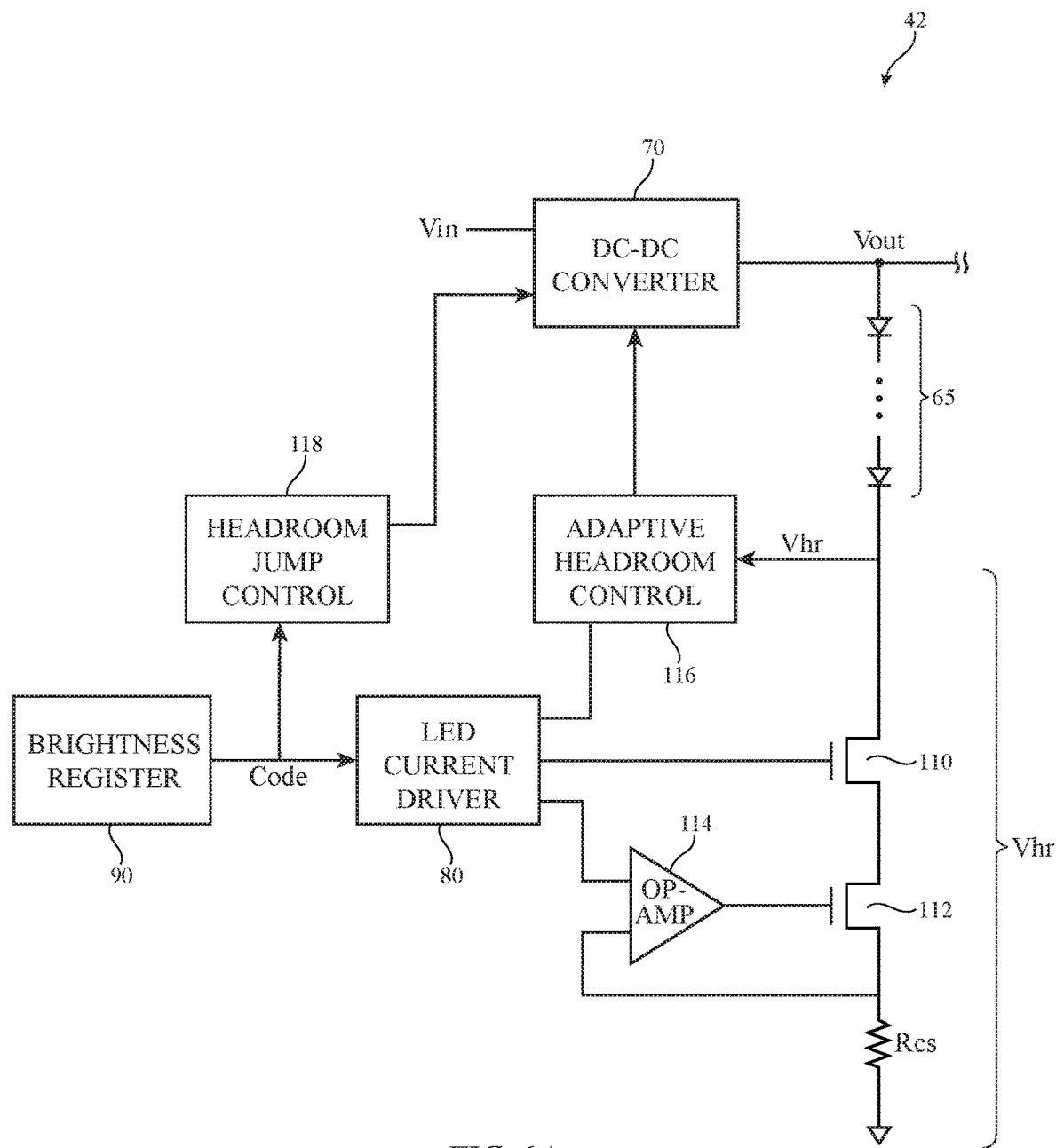
FIG. 6A is a diagram of illustrative backlight driver circuitry that includes a headroom jump control circuit.

As described above, the headroom voltage Vhr needs to be adjusted to maintain a sufficient headroom margin so that the LED current driver is able to deliver an accurate target current to each of the connected LED strings, but Vhr should not be adjusted too high to avoid excessive headroom power loss. FIG. 6A is a diagram of illustrative backlight driver circuitry that includes an adaptive headroom control circuit 116 coupled in a closed-loop configuration with DC-to-DC converter 70 in order to dynamically adjust headroom voltage Vhr. In the example of FIG. 5, LED string 65 may be coupled in series with pull-down transistors 110 and 112 and also current sensing resistor Rcs. Transistor 112 has a gate that is controlled by an operational amplifier 114, which has a first input that receives a reference voltage from current driver 80 and a second input that receives a sensing voltage from resistor Rcs. Arranged in this way, transistors 110 and 112 are driven to provide a target current $I_{LED}$ corresponding to the brightness code stored in register 90.

Generally, the adaptive headroom control loop controls converter 70 to adjust output voltage Vout based on the PWM frequency of the LED current driver 80. Adjusting Vout over one or more cycles of the PWM signal may, however, be too slow. In such scenarios, headroom voltage Vhr might be too low when LED current driver 80 begins driving the LED string. To increase the response time and to ensure that sufficient Vhr is present prior to driving the LED string, the backlight driver circuitry is sometimes provided with a headroom jump control circuit 118. The head jump control circuit 118 operates as follows. When the brightness code output from register 90 increases and when the step size exceeds a predefined threshold, circuit 118 will issue a jump command. The jump command will direct DC/DC converter 70 to step up Vout to guarantee a sufficient headroom voltage Vhr.

A jump command issued in this way, however, is a discontinuous solution since the jump command will only be issued when the step size is greater than the predetermined threshold. When the brightness code/command is adjusted by a step size amount that is lower than the predetermined threshold, the headroom voltage adjustment will be managed by the slower adaptive control loop (i.e., by adaptive headroom control logic 116). In such scenarios, since a jump command will not be issued, it is still possible that Vhr might be too low when LED current driver 80 starts to provide current through string 65.

Figure 6B:
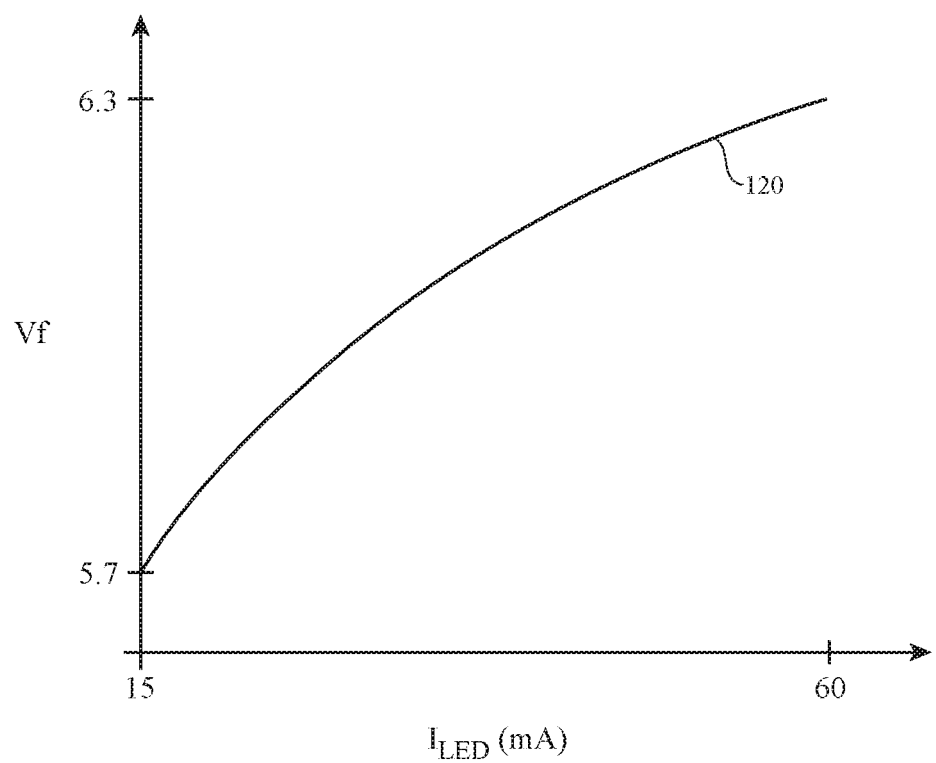
FIG. 6B is a plot illustrating how the forward voltage across an LED varies with current in accordance with an embodiment.

FIG. 6B is a plot illustrating how the forward voltage across an LED varies current ($I_{LED}$). As shown by trace 120, the forward voltage Vf across a single LED can vary nonlinearly. In the example of FIG. 6B, in the $I_{LED}$ current range of 15 mA to 60 mA, forward voltage Vf might increase from 5.7 V to 6.3 V by 0.6 V. If there are 10 LED elements in each string, a brightness adjustment corresponding to a current step from 15 mA to 60 mA could potentially result in up to a 6 V (e.g., 10*0.6) reduction at the headroom voltage Vhr if the jump command were not issued and if the adaptive control loop is too slow.

Figure 6C:
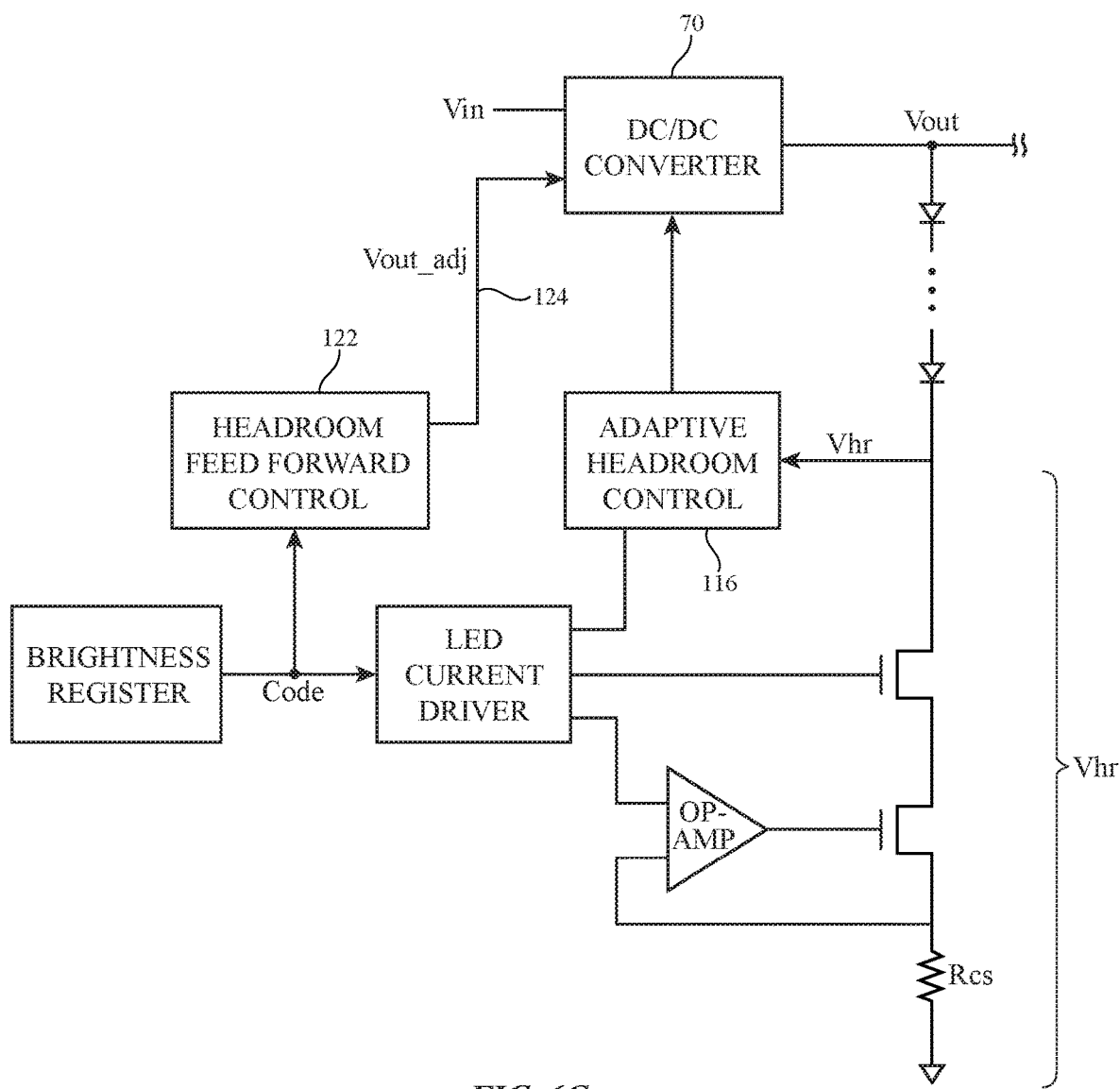
FIG. 6C is a diagram of illustrative backlight driver circuitry that includes a headroom feedforward control circuit in accordance with an embodiment.

In accordance with an embodiment, the backlight driver circuitry may be provided with feedforward control logic such as headroom feedforward control circuit 122 (see, e.g., FIG. 6C), which is configured to adjust Vout based on changes seen directly at the brightness code. As shown in FIG. 6C, headroom feedforward control circuit 122 may receive the stored brightness code/command directly from brightness register 90 and may generate a corresponding output voltage adjustment signal Vout_adj to DC/DC converter 70 over control path 124. For example, feedforward control circuit 122 might compute Vout_adj as follows:

$$V\text{out\_adj}=G*(B\_\text{next}-B\_\text{current}) \qquad (2)$$

where B_current represents the initial brightness code, where B_next represents the new brightness code, and where G represents the output voltage gain as a function of change in the target LED current. In other words, G may represent a linear or non-linear approximation of the slope of trace 120 as shown in FIG. 6B. Thus, equation (2) may be either a linear or nonlinear equation with both the current brightness setting (B_current) and target brightness setting (B_next) as inputs. The value Vout_adj computed by equation (2) refers to the predictive amount by which converter 70 should increase or decrease Vout. If desired, a different gain value G may be applied from step up versus step down cases (e.g., a first gain value may be used for brightness increases, whereas a second gain value that is different than the first gain value may be used for brightness reductions). In yet other suitable embodiments, Vout_adj may be encoded in the form of a lookup table instead of using an equation.

Figure 6D:
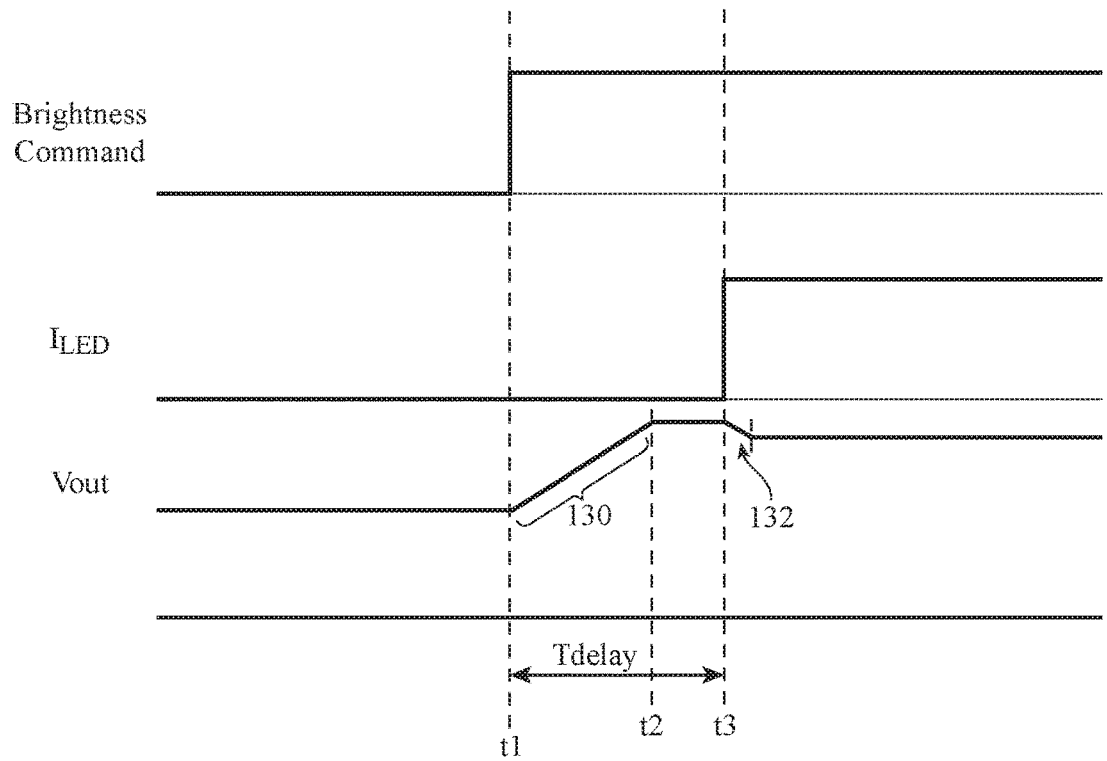
FIG. 6D is a timing diagram illustrating the operation of the headroom feedforward control circuit in accordance with an embodiment.

FIG. 6D is a timing diagram illustrating the operation of the headroom feedforward control circuit 122. As shown in FIG. 6D, the brightness code may be stepped up at time t1. In particular, a delay period (Tdelay) should be applied between the change of the brightness code at time t1 and time t3 when the LED drive current starts to increase. This delay will allow headroom feedforward control circuit 122 to begin adjusting Vout towards the desired level during phase 130 from time t1 to t2. During feedforward adjustment phase 130 when circuit 122 is directing DC-to-DC converter 70 to ramp up Vout, the adaptive feedback closed control loop may be optionally disabled (e.g., adaptive headroom control logic 116 may be turned off during phase 130). When the LED current starts to increase at time t3, the adaptive control loop may be enabled to further tune Vout to the target current level, as indicated by fine adjustment amount 132.

Figure 6E:
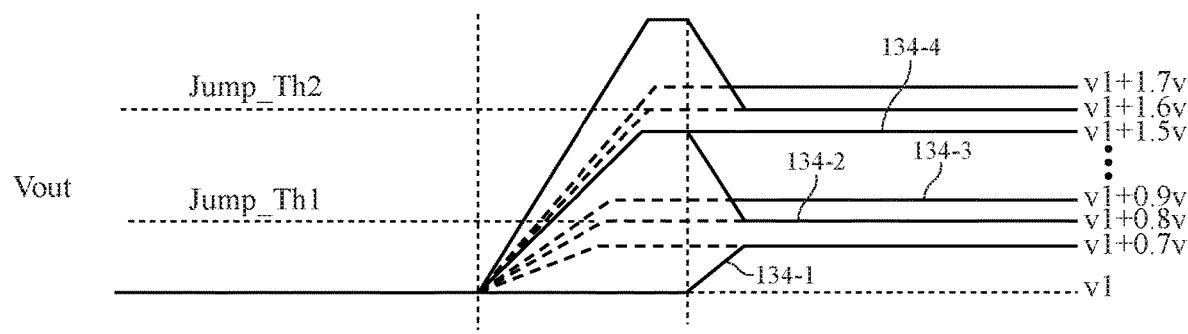
FIG. 6E is a timing diagram comparing resulting waveforms between a jump command and feedforward control in accordance with an embodiment.

FIG. 6E is a timing diagram comparing resulting waveforms between a jump command and the feedforward control scheme. Typically, the jump command offers only a few thresholds such as thresholds Jump_Th1 and Jump_Th2. When the change in brightness settings or when the desired amount of current change is greater than a specified threshold, the DC/DC converter 70 will adjust Vout to guarantee a sufficient headroom voltage for the LED current driver. In the example of FIG. 6E, consider the jump control architecture of FIG. 6A where a first jump threshold is set to 8 mA and where a second jump threshold is set to 16 mA.

When the current step is 0-7 mA, no jump command is issued and Vout is only adjusted up from initial voltage level v1 by the adaptive loop (see solid trace 134-1). When the current step is 8 mA, the first jump threshold is triggered, which causes Vout to jump to (v1+1.5 V), which is then subsequently adjusted back down to (v1+0.8 V) as shown by solid trace 134-2. Thus, the jump command results in an extra 0.7 V variation prior to settling at the correct voltage level. When the current step is 9 mA, the first jump threshold is triggered, which causes Vout to jump to (v1+1.5 V), which is then subsequently adjusted back down to (v1+0.9 V) as shown by solid trace 134-3. Thus, the jump command results in an extra 0.6 V variation prior to settling at the correct voltage level. When the current step is 15 mA, the first jump threshold is triggered, which causes Vout to jump to (v1+1.5 V), and no further adjustment is needed as shown by solid trace 134-4. Thus, there is no excess variation. The extra voltage variation introduced by the jump command may introduce acoustic noise, which is exacerbated when there is a ceramic capacitor at the output of the DC/DC converter 70.

In contrast to the jump command mechanism described above, the feedforward control scheme of the type described in connection with FIGS. 6C and 6D adjusts converter output voltage Vout directly towards the target final value, as indicated by the dotted waveforms in FIG. 6E. Any minor deviation from the intended final value can be fine-tuned by the adaptive control loop (e.g., using adaptive headroom control circuit 116). Since the headroom feedforward control circuit 122 adjusts Vout directly towards the final target value, the extra voltage variation is comparatively much smaller than that introduced by a jump command, which dramatically reduces the risk of having acoustic issues at DC-to-DC converter 70. Thus, this feedforward control mechanism can ensure sufficient headroom for the LED current driver while minimizing DC/DC voltage variation and thus suppressing acoustic noise.

As describe above, DC-to-DC converter 70 can either be a step-up (boost) converter or a step-down (buck) converter. Configurations in which DC/DC converter 70 is a boost converter will be described below as an example. Consider, for instance, a scenario in which a boost converter receives an input voltage of 12 V and uses a switching transistor to generate an output voltage of 60 V, where the output current is 1 A. Assuming the switching transistor is modulated at a frequency of 250 kHz, the power loss on that transistor may be as high as 2.8 W. At such elevated power loss levels, the risk that the switching transistor becomes thermally overstressed is high, which can dramatically shorten the lifespan of the converter. Moreover, the DC/DC converter is often part of a system with limited allowable height, thus prohibiting the use of a heatsink for thermal dissipation.

Figure 7A:
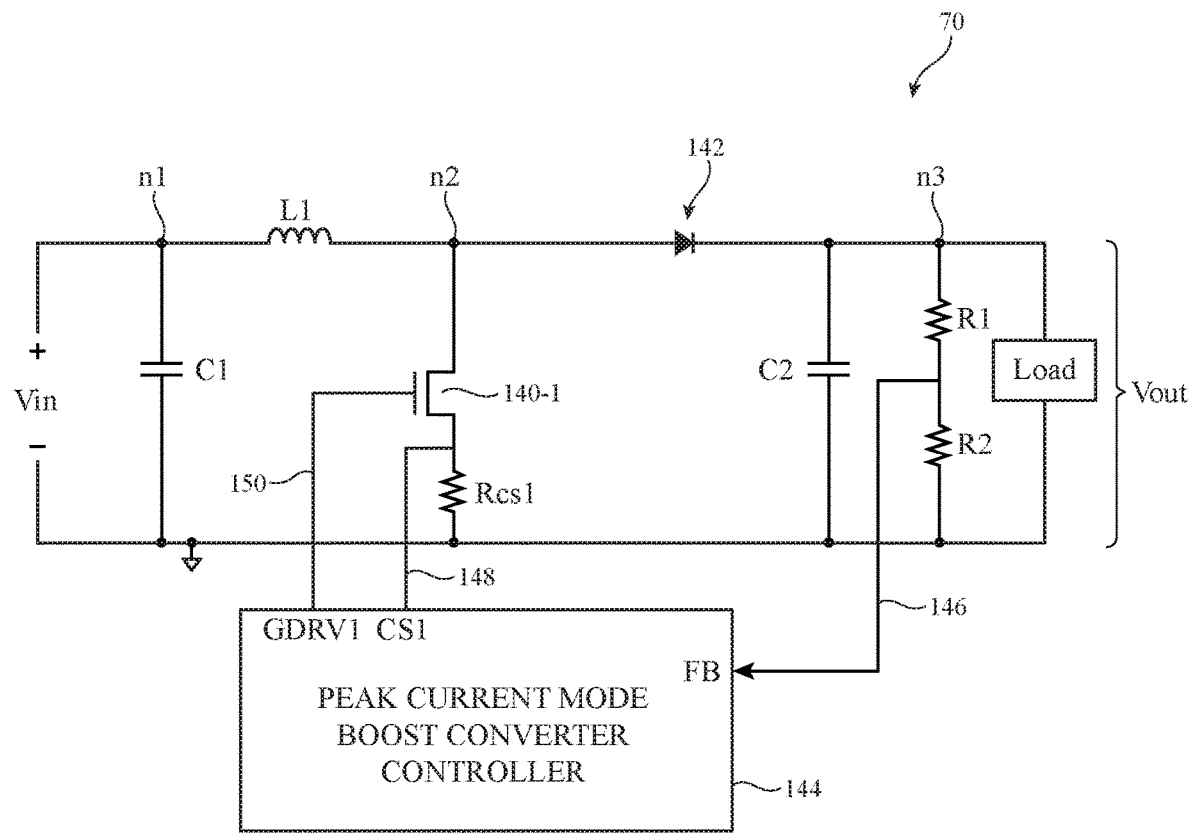
FIG. 7A is a circuit diagram of an illustrative boost converter with a single-phase single-switch configuration in accordance with an embodiment.

To help improve product reliability, converter 70 may be provided with a peak current mode boost converter controller that has multiple gate drivers for driving one or more switching transistors and multiple current sensing inputs for monitoring the current associated with one or more phases of boost converter 70. FIG. 7A shows how boost converter 70 is configured in a single-phase single-switch arrangement. The single-phase single-switch configuration may be particularly suitable for a low load application.

As shown in FIG. 7A, converter 70 has an input port configured to receive input voltage Vin, an input capacitor C1 coupled across the input port between node n1 and the ground power supply line, an inductor L1 coupled between node n1 and node n2, a switching transistor 140-1 and a current sensing resistor Rcs1 coupled in series between node n2 and the ground line, a diode 142 connected between node n2 and node n3, an output capacitor C2 coupled between node n3 and the ground line, and output resistors R1 and R2 coupled in series between node n3 and the ground line. Node n3 serves as the output port for boost converter 70, where a corresponding boosted output voltage Vout is provided to whatever load is connected to output node n3.

In accordance with an embodiment, switching transistor 140-1 (e.g., a metal-oxide-semiconductor field-effect transistor, a bipolar junction transistor, a micro-electro-mechanical systems switch, or other type of switching device) may be controlled by a control circuit such as peak current mode boost converter controller 144. Controller 144 may have an input configured to receive a voltage signal from the voltage divider of R1 and R2 via feedback path 146. Controller 144 may further include a first current sensing (CS1) input configured to receive a voltage signal from current sensing resistor Rcs1 via sensing path 148. By monitoring the voltage on sensing path 148, controller 144 is capable of detecting when a peak current level has been reached. The peak current level can be any amount of current that is determined by the designer to place excessive stress on switch 140-1.

Figure 7B:
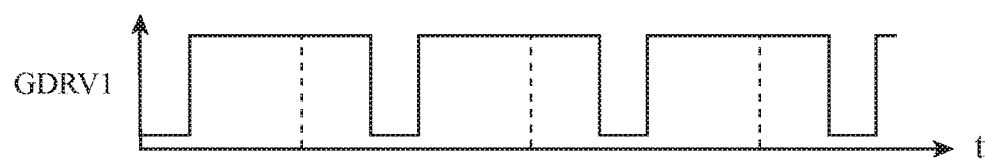
FIG. 7B is a timing diagram illustrating how the single switch in the boost converter of FIG. 7A can be turned off when a peak current level is reached in accordance with an embodiment.

In response to detecting the peak current level at input CS1, peak current mode boost converter controller 144 may immediately disable transistor 140-1 (e.g., by deasserting or driving low a first gate driver output GDRV1) for the remainder of that switching cycle. As an example, controller 144 may include a comparator that compares the sensing voltage received over path 148 to a predetermined threshold. If the sensing voltage exceeds the predetermined threshold, controller 144 may temporarily assert gate driver output signal GDRV1. Gate driver output signal GDRV1 may be reasserted at the beginning of the next switching cycle to reactivate switching transistor 140-1. FIG. 7B is a timing diagram illustrating how the boost converter of FIG. 7A can be periodically turned off when the peak current level is reached. As shown in FIG. 7B, first gate driver output signal GDRV1 is pulsed low whenever the controller 144 detects that the peak current level has been exceeded.

Figure 7C:
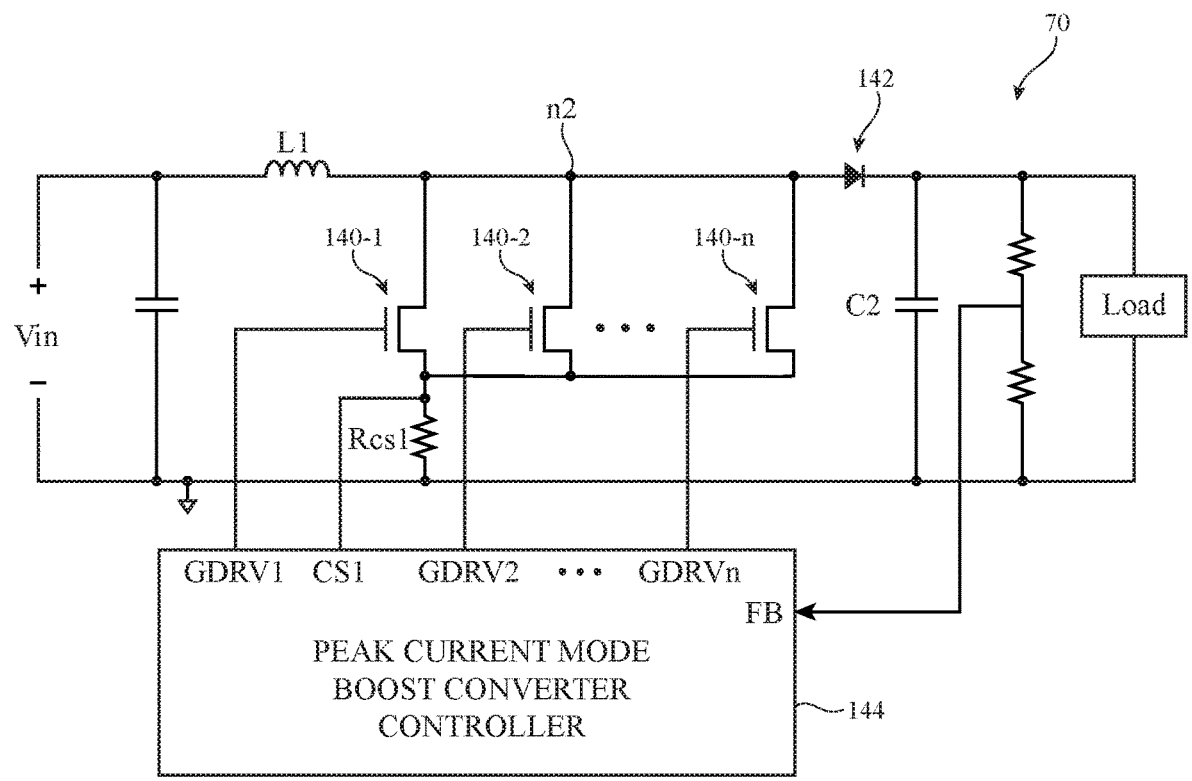
FIG. 7C is a circuit diagram of an illustrative boost converter with a single-phase multi-switch configuration in accordance with an embodiment.

To further reduce the power loss on switching transistor 140-1, additional switching transistors may be coupled in parallel with transistor 140-1 to help distribute the thermal stress among a group of switching transistors. FIG. 7C shows another suitable arrangement of boost converter 70 that is configured in a single-phase multi-switch arrangement. The single-phase multi-switch configuration may be particularly suitable for medium load applications.

The general structure of boost converter 70 of FIG. 7C is similar to that of FIG. 7A. Thus, components drawn in the same location and connected in the same way need not be described again in detail to avoid obscuring the present embodiments. In contrast to FIG. 7A, however, the boost converter architecture of FIG. 7C includes multiple switches 140 (e.g., switching transistors 140-1, 140-2, . . . , 140-*n*) coupled in parallel between node n2 and current sensing resistor Rcs1. Here, the source terminal of each transistor 140 is connected to the same common resistor Rcs1. These multiple parallel switches 140 can all be controlled using peak current mode boost converter controller 144.

As described above, controller 144 receives a current sensing voltage signal from resistor Rcs1 via sensing path 148. By monitoring the voltage on sensing path 148, controller 144 is capable of detecting when the peak current level has been reached. Similar to the single-switch embodiment of FIG. 7A, controller 144 of FIG. 7C may also include a single comparator that compares the sensing voltage received over path 148 to a predetermined threshold (e.g., all switches share the same current sensing resistor and the same peak current comparator). If the sensing voltage exceeds the predetermined threshold, controller 144 may turn off the currently activated switch 140.

Figure 7D:
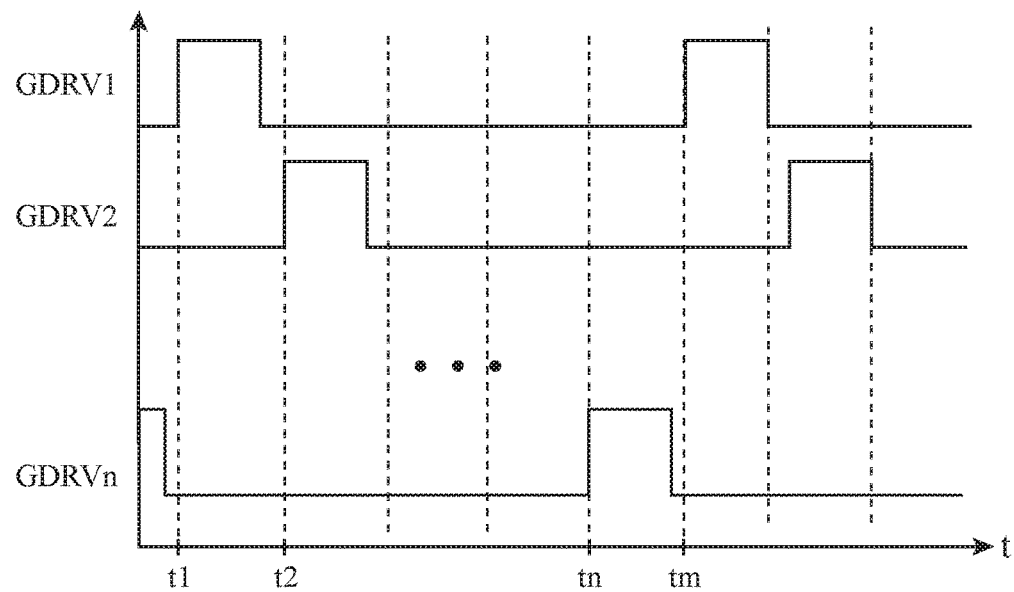
FIG. 7D is a timing diagram illustrating how the multiple switches in the boost converter of FIG. 7C can be successively turned on when a peak current level is reached in accordance with an embodiment.

In contrast to the single-switch scenario where switching transistor 140-1 is turned on at the beginning of each switching cycle, the gate turn-on periods should be distributed evenly among the various switching transistors. FIG. 7D is a timing diagram illustrating how the multiple parallel switches 140 in the boost converter of FIG. 7C can be successively turned on. As shown in FIG. 7D, gate driver output signal GDRV1 may be pulsed high at time t1 (i.e., at the start of the switching cycle) to switch on transistor 140-1; gate driver output signal GDRV2 may be pulsed high at time t2 after GDRV1 falls low to switch on transistor 140-2; . . . ; and gate driver output signal GDRVn may be pulsed high at time tn to switch on transistor 140-n, where GDRVn will be driven back low before the start of the next switching cycle at time tm, when the whole process repeats itself. Operated in this way, the power loss of each switching transistor 140 in the group of parallel switches is balanced and reduced. In general, the power loss of each switching transistor 140 may be reduced by approximately n times relative to the single-switch embodiment.

Figure 7E:
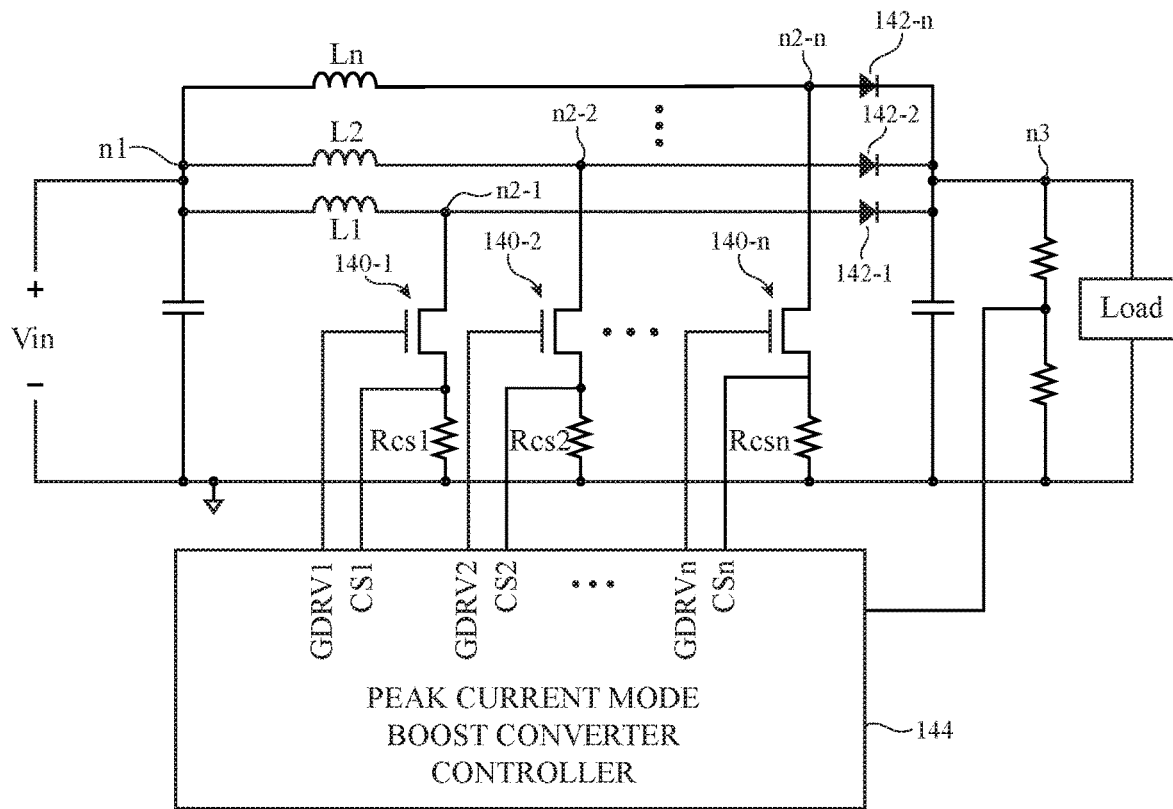
FIG. 7E is a circuit diagram of an illustrative boost converter with a multi-phase multi-switch configuration in accordance with an embodiment.

FIG. 7E shows yet another suitable arrangement of boost converter 70 that is configured in a multi-phase multi-switch arrangement. The multi-phase multi-switch configuration may be particularly suitable for high load applications. The general structure of boost converter 70 of FIG. 7E is similar to that of FIG. 7A. Thus, components drawn in the same location and connected in the same way need not be described again in detail to avoid obscuring the present embodiments.

In contrast to FIG. 7A, however, the boost converter topology of FIG. 7E includes multiple inductors L1, L2, . . . , Ln that are coupled to corresponding switches 140, each of which is connected to a different respective current sensing resistor (i.e., the current sensing resistors are not shared among the various switching transistors). As shown in FIG. 7E, inductor L1 is coupled to output node n3 via diode 142-1; inductor L2 is coupled to output node n3 via diode 142-2; . . . ; and inductor Ln is coupled to output node n3 via diode 142-n. First switching transistor 140-1 and first current sensing resistor Rcs1 are coupled in series between node n2-1 (i.e., the node connecting L1 to diode 142-1) and the ground line. Second switching transistor 140-2 and second current sensing resistor Rcs2 are coupled in series between node n2-2 (i.e., the node connecting L2 to diode 142-2) and the ground line. N-th switching transistor 140-n and n-th current sensing resistor Rcsn are coupled in series between node n2-n (i.e., the node connecting Ln to diode 142-n) and the ground line. These multi-phase switches 140 can all be controlled using peak current mode boost converter controller 144.

Configured in this way, each phase has its own dedicated switching transistor and its own dedicated current sensing resistor. Unlike the previous embodiments, controller 144 of FIG. 7E may include a dedicated comparator for each phase to individually turn off the corresponding switching transistor when the peak current has been reached. For example, controller 144 may have a first comparator that compares the first current sensing voltage from Rcs1 to a preselected threshold to determine whether or not to assert GDRV1, a second comparator that compares the second current sensing voltage from Rcs2 to the preselected threshold to determine whether or not to assert GDRV2, . . . , and an n-th comparator that compares the last current sensing voltage from Rcsn to the preselected threshold to determine whether or not to assert GDRVn. Operated in this way, controller 144 is capable of detecting when the peak current level has been reached for any of the switching transistors 140. If any of the sensed voltage exceeds the predetermined threshold, controller 144 may turn off the corresponding switch 140.

Figure 7F:
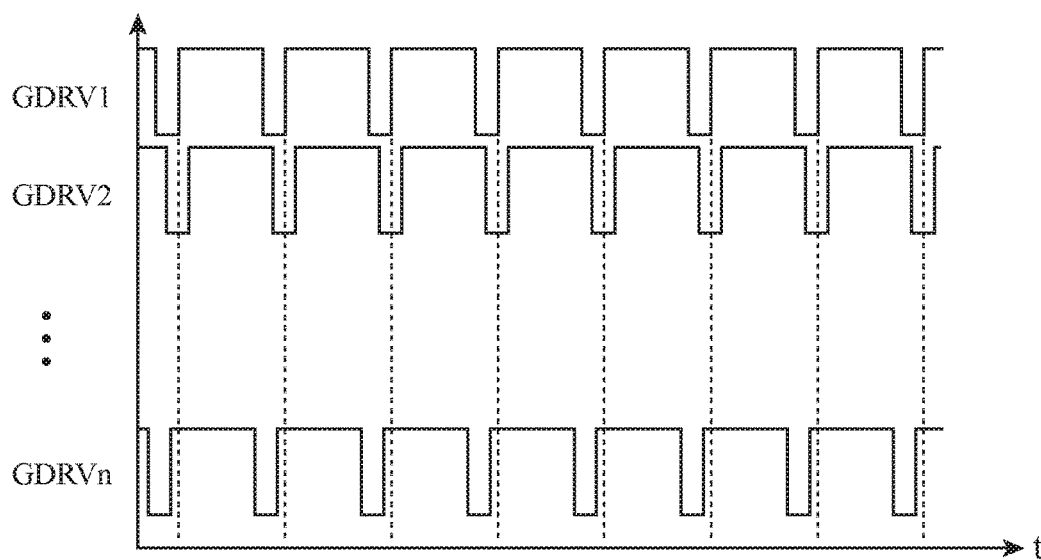
FIG. 7F is a timing diagram illustrating how the multiple switches in the boost converter of FIG. 7E can be turned off when a peak current level is reached in accordance with an embodiment.

FIG. 7F is a timing diagram illustrating how switches 140 associated with the different phases can be individually disabled when the peak current level has been reached. As shown in FIG. 7F, the gate driver output signals GDRV1, GDRV2, . . . , and GDRVn can be phase-shifted from one another by 360/n degrees to help minimize voltage ripple. In an example where there are 12 phases (e.g., 12 switching transistors each of which is connected to a different respective current sensing resistor), the gate driver output signals may be offset by 30 degrees with respect to one another. In another example where there are six phases, the gate driver output signals may be delayed by 60 degrees with respect to one another. In yet another example where there are only two phases, the gate driver output signals may be delayed by 180 degrees with respect to each other. Operated in this way, the power loss of each switching transistor 140 is reduced while reducing the output voltage ripple at node n3 relative to the single-phase embodiment.

The examples of FIGS. 7A-7F show how booster converter 70 may be reconfigured to support a wide load range without over stressing the switching transistors.

Figure 8A:
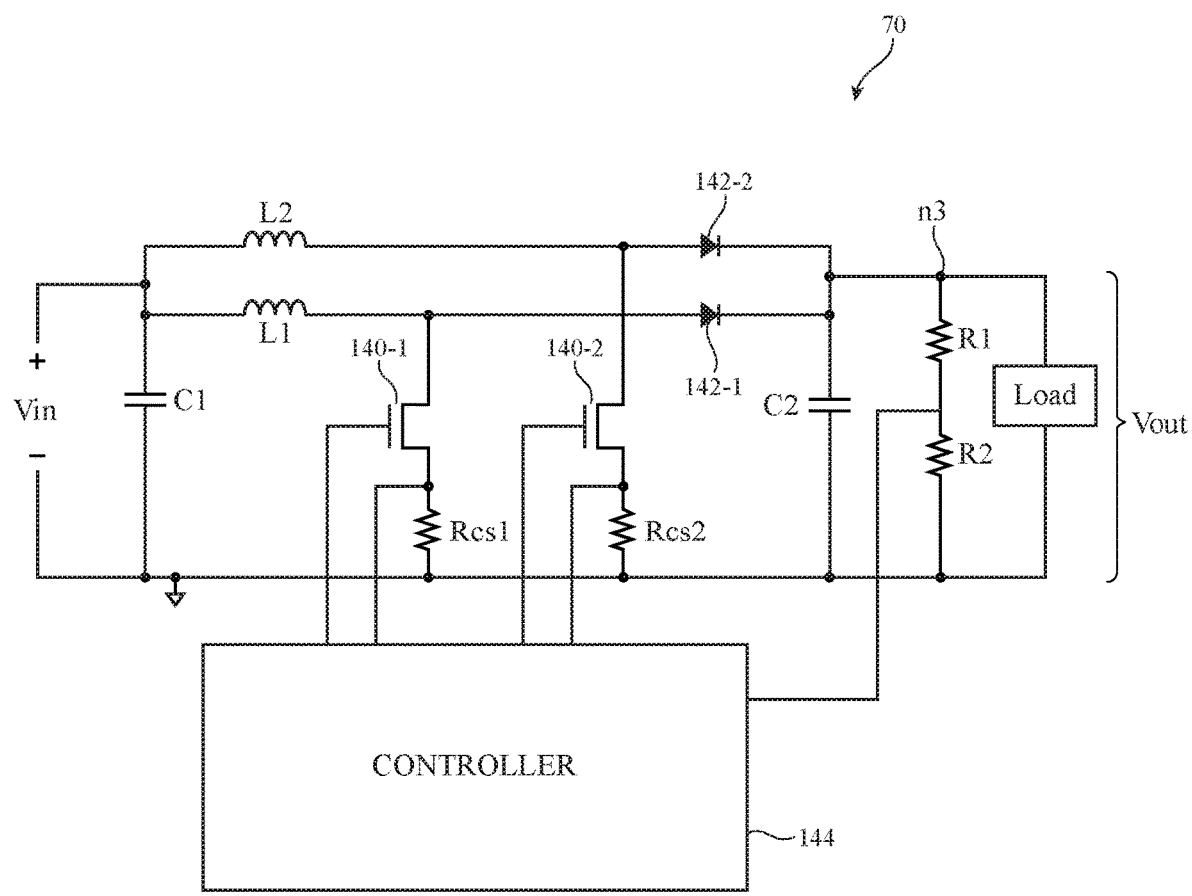
FIG. 8A is a circuit diagram of an illustrative dual-phase boost converter in accordance with an embodiment.

In accordance with another suitable embodiment, a multi-phase boost converter may be configured in multiple modes depending on the size of the load. FIG. 8A is a circuit diagram of an illustrative dual-phase boost converter 70 that is operable in a first (single-phase) mode for supporting light loads and a second (dual-phase mode) for supporting larger loads. As shown in FIG. 8A, boost converter 70 may include a first switching transistor 140-1 and a first current sensing resistor Rcs1 coupled in series between inductor L1 and the ground line and a second switching transistor 140-2 and a second current sensing resistor Rcs2 coupled in series between inductor L2 and the ground line. During the single-phase mode, controller 144 may only activate the first switch 140-1 (sometimes referred to as being associated with the "master" phase). During the dual-phase mode, controller 144 may activate both the first switch 140-1 and the second switch 140-2 (sometimes referred to as being associated with the "slave" phase).

Figure 8B:
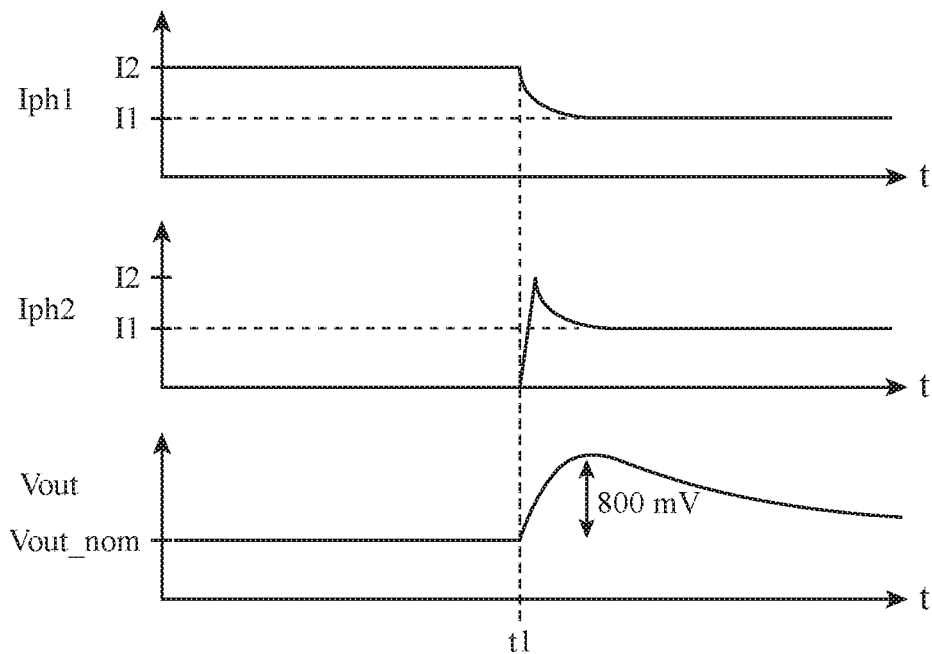
FIG. 8B shows timing diagrams illustrating a possible voltage overshoot at the output of the dual-phase boost converter when switching from one to two phases.

Transient issues may arise when transitioning between the two modes. FIG. 8B shows timing diagrams illustrating a voltage overshoot at the output of dual-phase boost converter 70 when switching from one to two phases. At time t1, the slave phase is turned on, and the slave phase current Iph2 (i.e., the current flowing through transistor 140-2) rises to match the master phase current Iph1 (e.g., both Iph1 and Iph2 should settle at current level I1). During this transient period, converter output voltage Vout may exhibit an 800 mV overshoot.

Figure 8C:
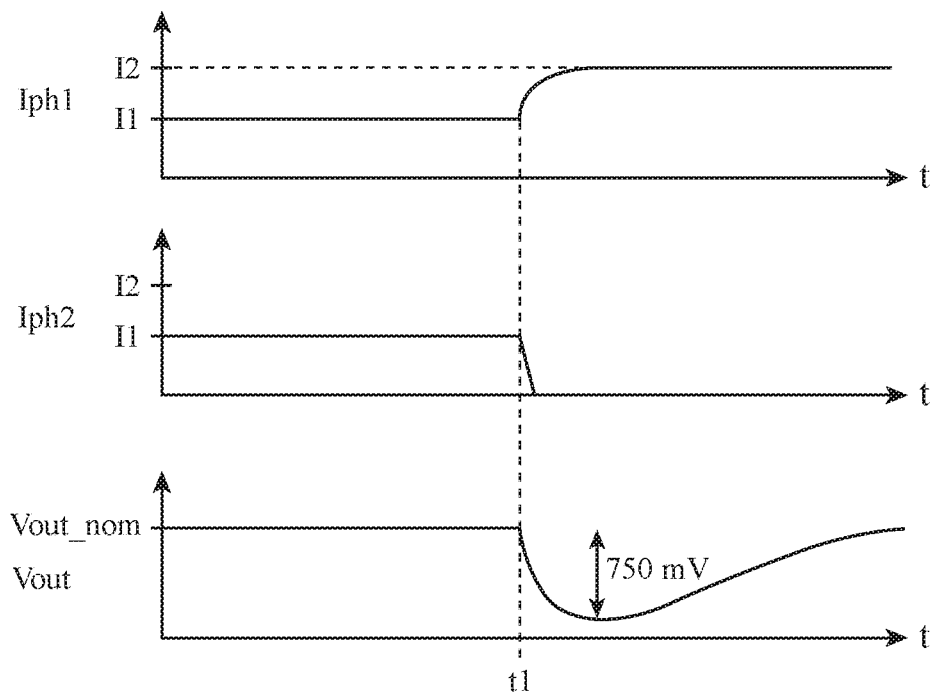
FIG. 8C shows timing diagrams illustrating a possible voltage undershoot at the output of the dual-phase boost converter when shedding from two phases to a single phase.

FIG. 8C shows timing diagrams illustrating a voltage undershoot at the output of dual-phase boost converter 700 when switching from two phases to a single phase (a process sometimes referred to as "phase shedding"). At time t1, the slave phase is turned off, which forces slave phase current Iph2 down low and causes master phase current Iph1 to rise back up to current level I2. During this transient period, converter output voltage Vout may exhibit a 750 mV undershoot.

The excessive Vout overshoot shown in FIG. 8B would introduce extra power loss since the headroom voltage for the LED strings being driven is increased. The excessive Vout undershoot shown in FIG. 8C could cause critical operational issues since the headroom voltage could fall below a driver saturation voltage.

Figure 8D:
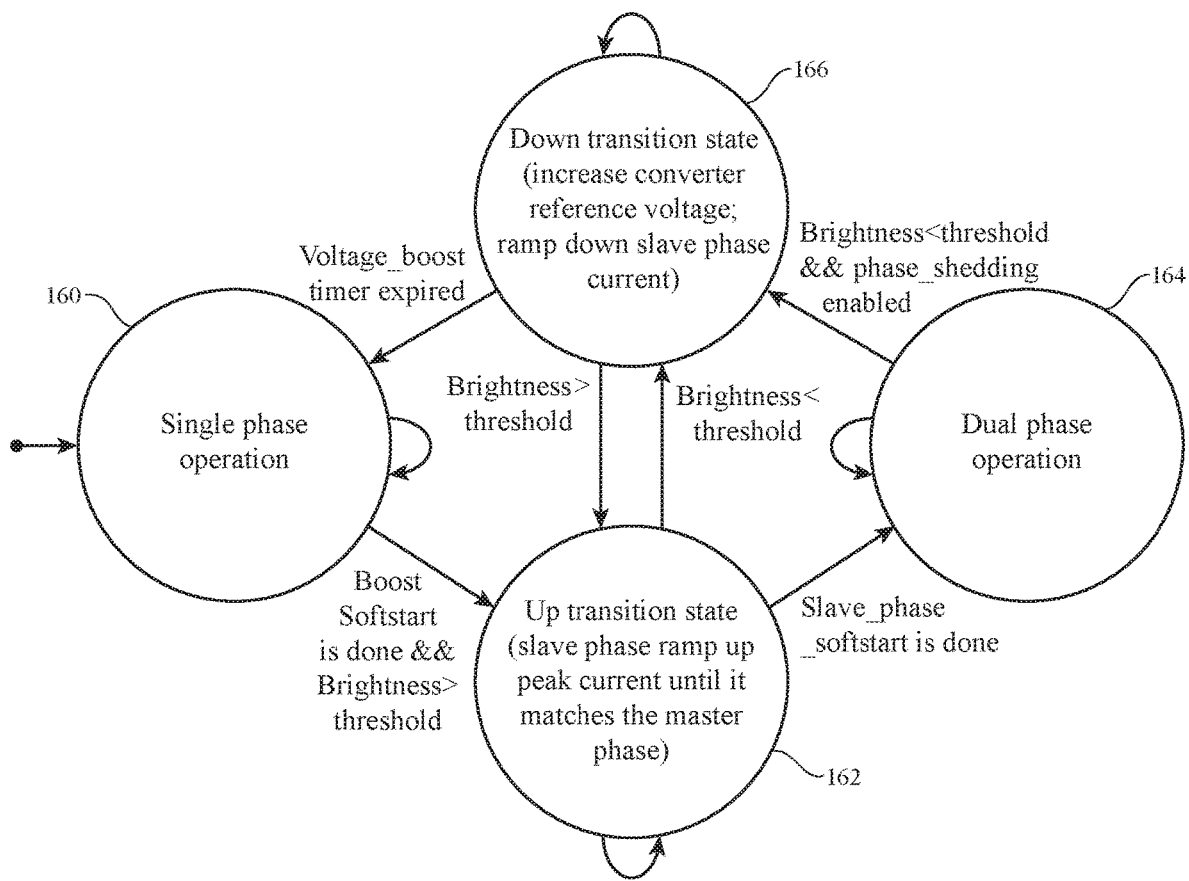
FIG. 8D is a diagram illustrating how a dual-phase boost converter may transition between a single-phase operation and a dual-phase operation while minimizing voltage overshoot/undershoot in accordance with an embodiment.

To help reduce the excessive voltage overshoot and undershoot at the output of the boost converter, an improved transitioning mechanism is provided. FIG. 8D is a diagram illustrating how dual-phase boost converter 70 may transition between a single-phase operational mode 160 and a dual-phase operational mode 164 while minimizing voltage overshoot/undershoot. Boost converter 70 may optionally be operated in the single-phase operation by default. When operated in the single-phase mode 160, boost softstart may be initiated so that the boost converter output ramps up slowly (i.e., instead of stepping up abruptly). When the boost softstart is done and when the brightness setting (e.g., an externally-supplied brightness code or command) exceeds a first predetermined threshold, the boost converter may transition from single-phase mode 160 to dual-phase mode 164 via an up-transition state 162. In the up-transition state 162, instead of driving the slave phase current directly to the intended current level, the slave phase current may be slowly ramped up to match the master phase current. After the slave phase current ramping is done (sometimes referred to as a slave phase "soft start"), the boost converter will operate in dual-phase mode 164.

When the brightness setting falls below a second predetermined threshold (which can be equal to or different than the first predetermined threshold) and assuming phase shedding is enabled, the boost converter may transition from dual-phase mode 164 to single-phase mode 160 via a down-transition state 166. In the down-transition state 166, a converter reference voltage is temporarily increased (e.g., to adjust Vout to an elevated level) and the slave phase may be slowly ramped down to zero. After a voltage boost timer expires, the boost converter will operate in single-phase mode 160. Operation may optionally transition from the up-transition state 162 to the down-transition state 166 if the brightness falls below the first predetermined threshold, whereas operation may optionally transition from the down-transition state 166 to the up-transition state 162 if the brightness exceeds the second predetermined threshold.

Figure 8E:
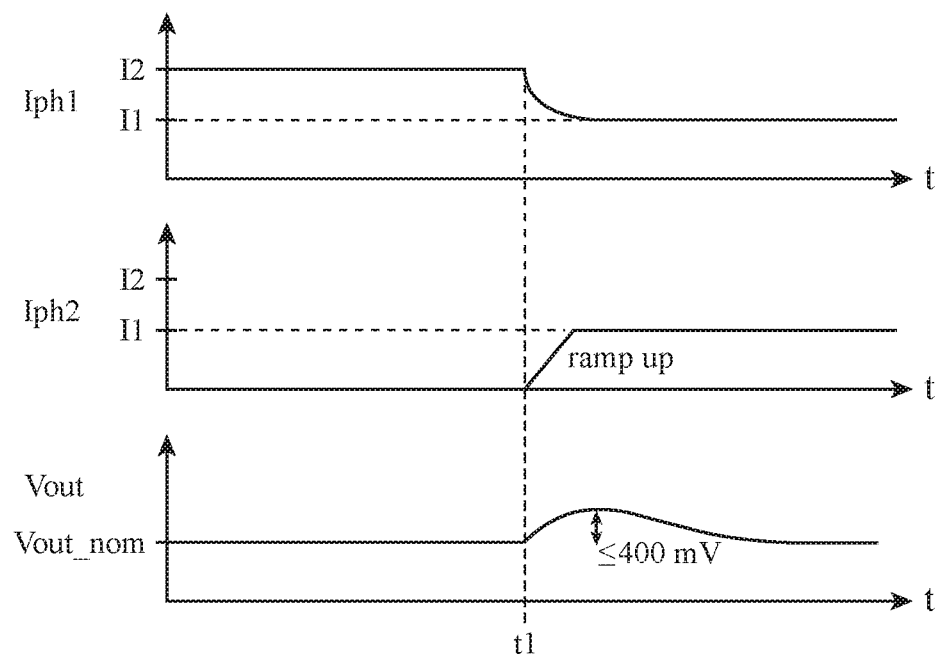
FIG. 8E are timing diagrams illustrating how the voltage overshoot at the output of the dual-phase boost converter is reduced when switching from one to two phases in accordance with an embodiment.

FIG. 8E shows timing diagrams illustrating relevant waveforms during the up-transition state 162 when switching from one to two phases. At time t1, the slave phase current Iph2 is slowly ramped up to match the master phase current Iph1. By ramping up the slave phase current over a longer period of time, the converter output voltage overshoot may be reduced by half.

Figure 8F:
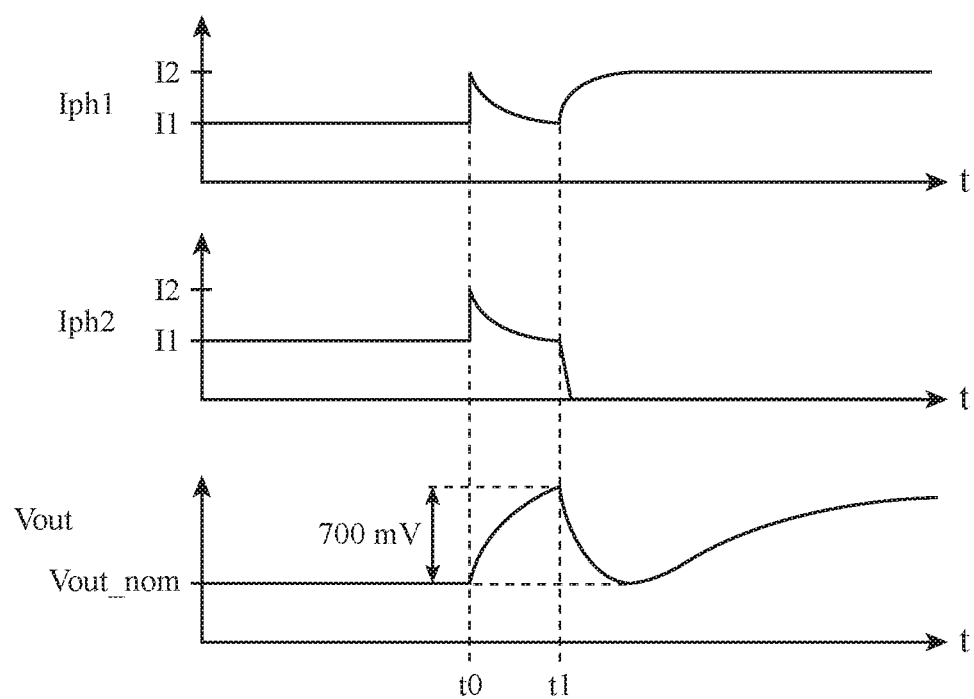
FIG. 8F shows timing diagrams illustrating how the voltage undershoot at the output of the dual-phase boost converter is eliminated when shedding from two phases to a single phase.

FIG. 8F shows timing diagrams illustrating relevant waveforms during the down-transition phase-shedding state 166. At time t0, the converter output voltage Vout may be increased by 700 mV (as an example) to compensate for the subsequent voltage dip when switching actually occurs at time t1. When the slave phase is turned off at time t1, the resulting transient voltage dip will cause Vout to drop, but Vout will still be maintained at or above the minimum required nominal output level Vout nom. Operated in this way, sufficient headroom voltage can be guaranteed to avoid converter operational issues.

Figure 8G:
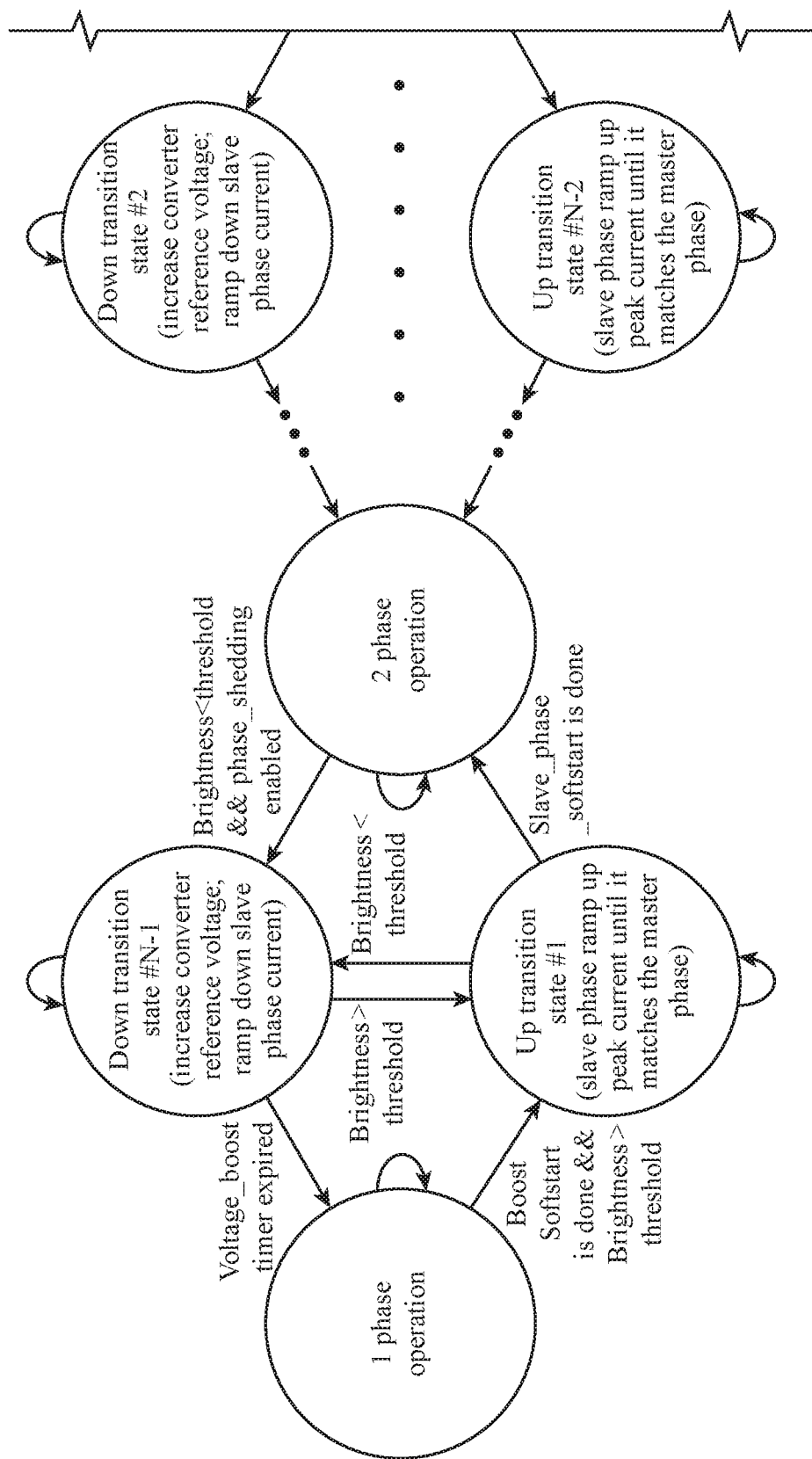
FIG. 8G is a diagram illustrating how a multi-phase boost converter may transition among any number of phase modes while minimizing voltage overshoot/undershoot in accordance with an embodiment.
Figure 8G:
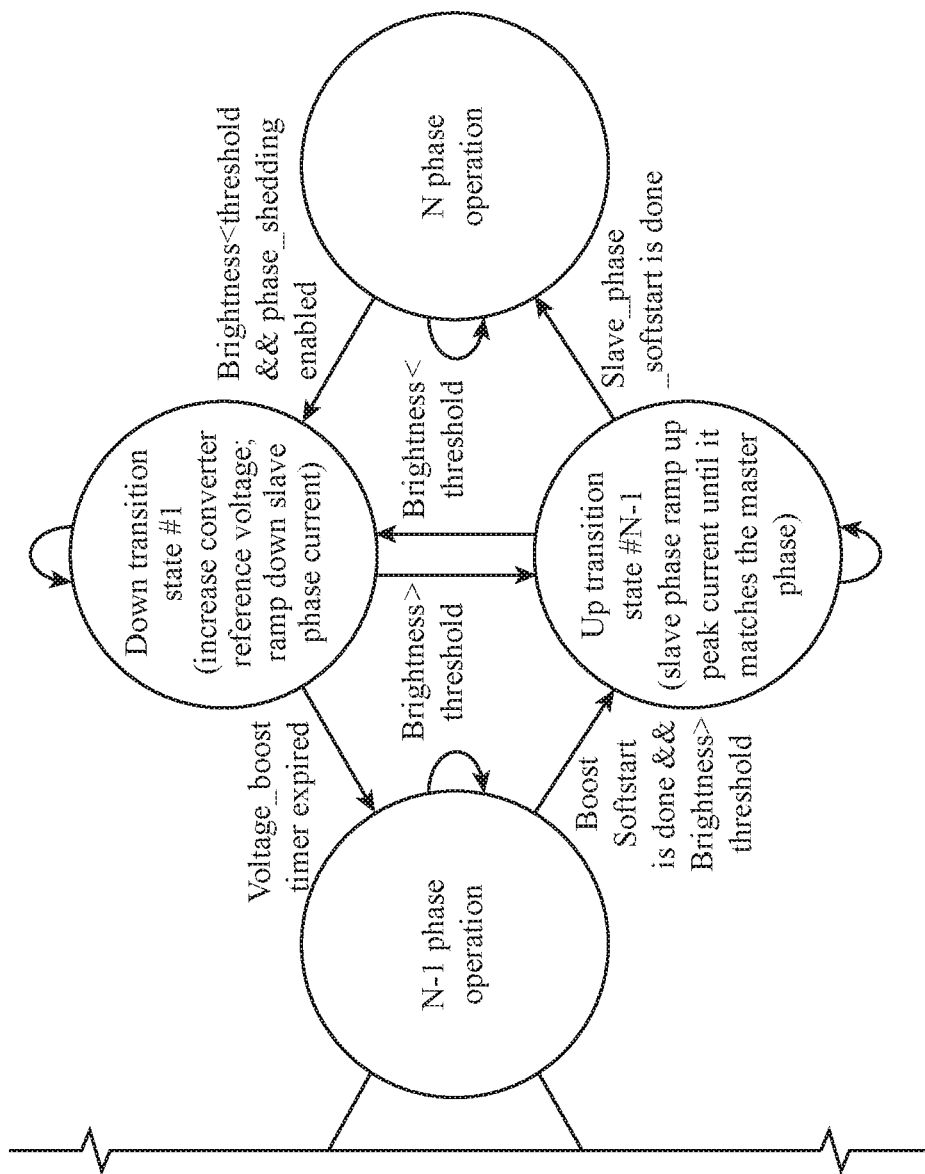

The example of FIG. 8D in which the improved transitioning mechanism is applied to a dual-phase boost converter is merely illustrative and is not intended to limit the scope of the present embodiments. If desired, this transitioning mechanism can be extended to an N-phase converter, where N is any integer greater than two. FIG. 8G is a state diagram for an N-phase boost converter, where each slave phase can be individually turned on and turned off one by one while minimizing voltage overshoot/undershoot.

Figure 9A:
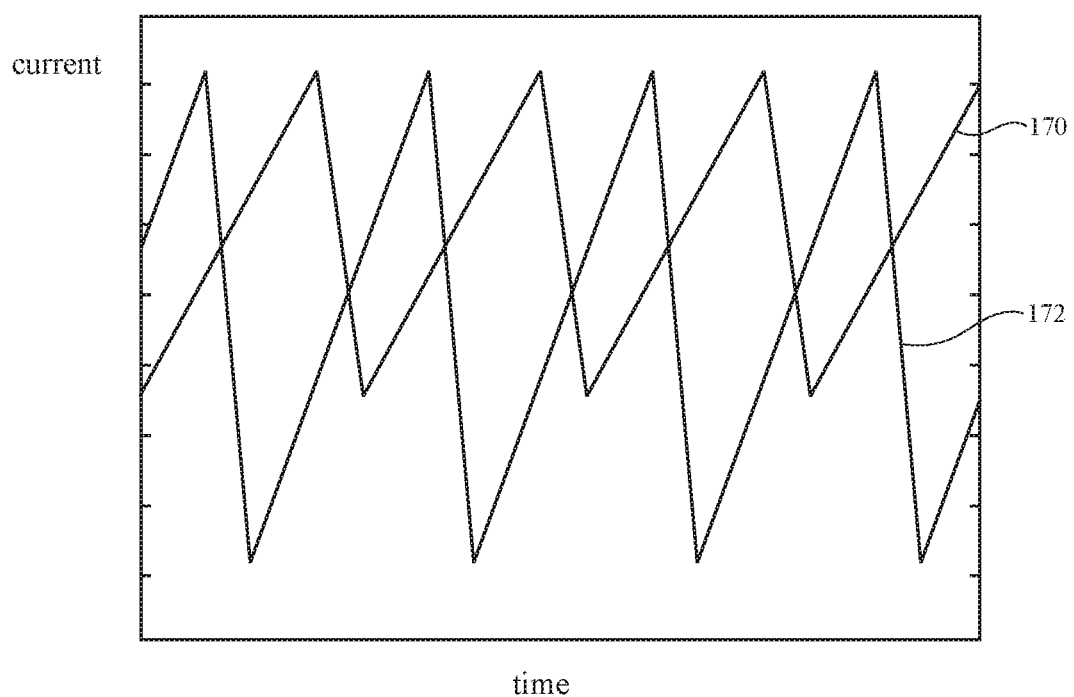
FIG. 9A is a plot illustrating a substantial power loss mismatch when there is inductance deviation between the two phases of a boost converter.

Another issue that might arise in multi-phase boost converters is the issue of inductor mismatch. Consider for example a scenario where a dual-phase boost converter has mismatched inductances between the two phases. FIG. 9A is a plot illustrating a substantial power loss mismatch in a dual-phase boost converter operating at a 2 MHz switching frequency when the inductance of one phase is 39.6 uH (i.e., 120%*33 uH) and when the inductance of the other phase is 26.4 uH (i.e., 80%*33 uH). As shown in FIG. 9A, the peak-to-peak ripple of the lower inductance phase (see waveform 172) is 150% of the peak-to-peak ripple of the higher inductance phase (see waveform 170). This peak-to-peak inductor current mismatch between the two phases introduces large power loss mismatch for key electrical components within the converter.

Figure 9B:
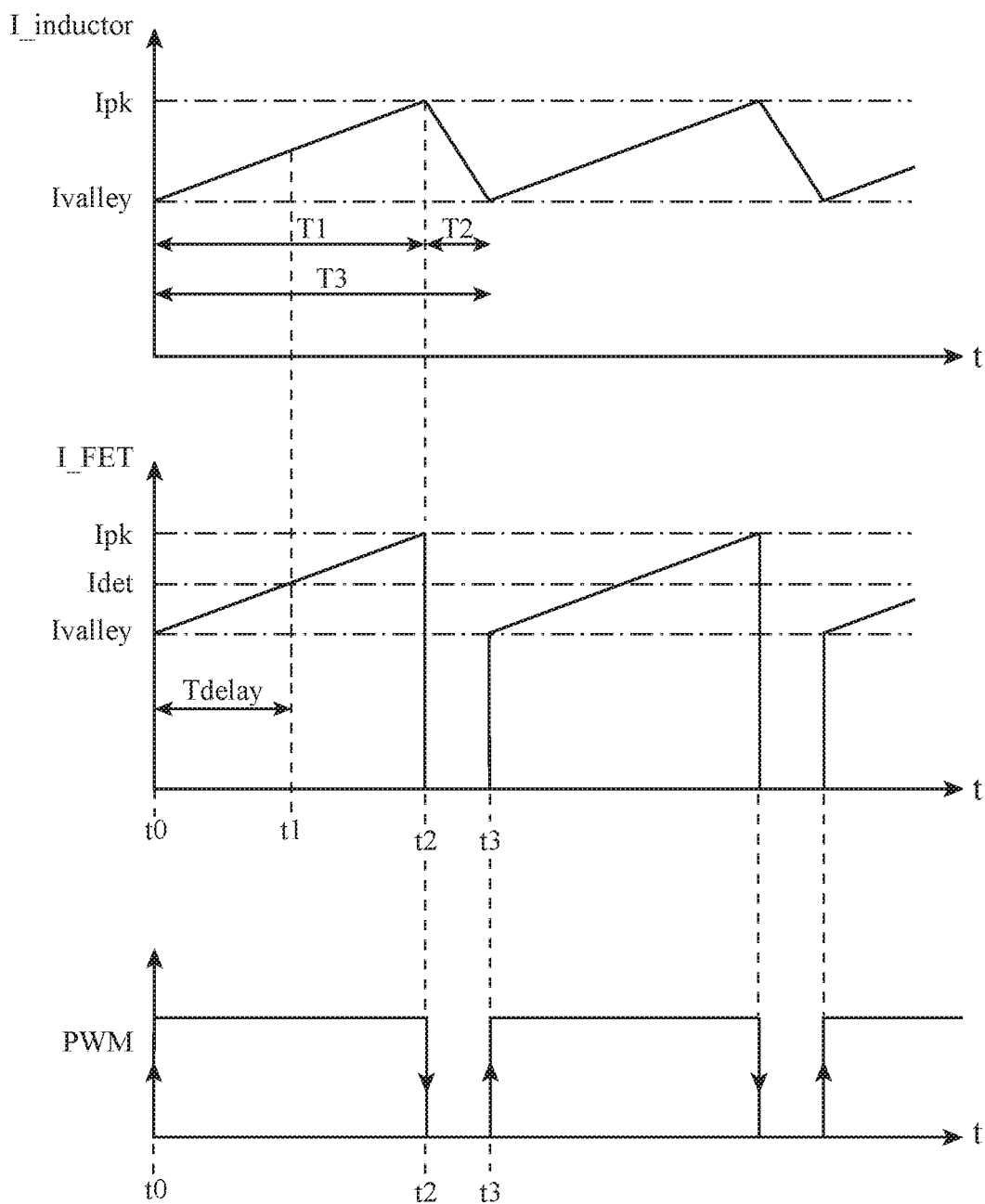
FIG. 9B are timing diagrams illustrating relevant current waveforms when operating a boost converter using a pulse-width modulated (PWM) scheme in accordance with an embodiment.

FIG. 9B are timing diagrams illustrating relevant current waveforms when operating a boost converter using a pulse-width modulated (PWM) scheme. As shown in FIG. 9B, the amount of current flowing through an inductor I_inductor might vary between a valley current level Ivalley and a peak current level Ipk. At time t0 (at the rising edge of the PWM signal), the switching transistor may be turned on, and the current through that switching transistor I_FET may increase from Ivalley towards Ipk for a duration T1. At time t2 (at the falling edge of the PWM signal), the switching transistor may be turned off, so I_FET falls to zero. As a result, the inductor current I_inductor may start dropping during time period T2. At time t3 (at the next rising edge of the PWM signal), the whole process may repeat itself. The duration T3 between time t0 and t3 may represent the entire period of the PWM signal. Period T1 may be referred to as the PWM on time, whereas period T2 may be referred to as the PWM off time.

Figure 9C:
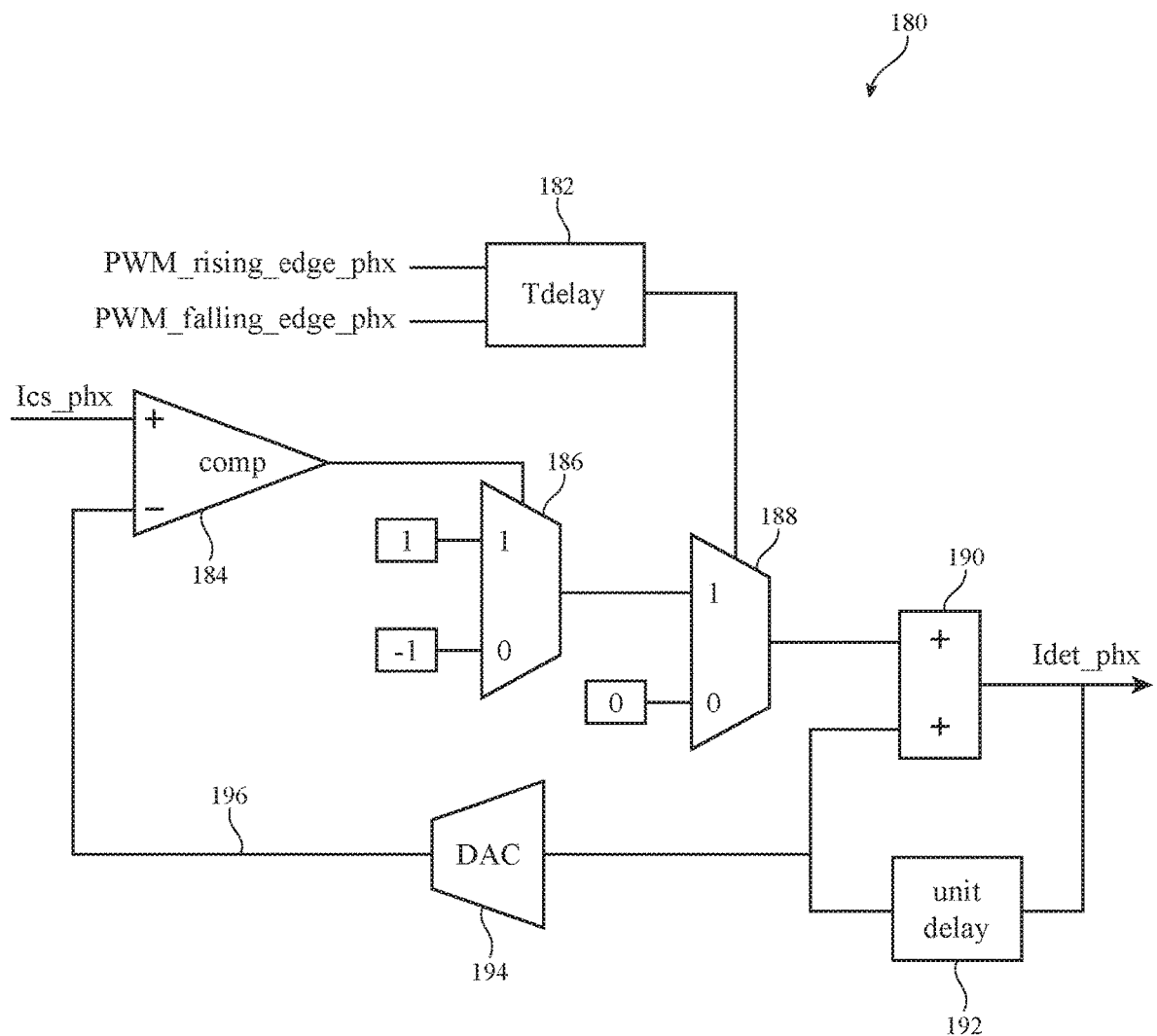
FIG. 9C is a diagram of an illustrative current detection circuit in accordance with an embodiment.

For a boost converter, the inductor current flows through the associated switching transistor and current sensing resistor. For instance, in the example of FIG. 8A, the current through inductor L1 may flow through corresponding switching transistor 140-1 and current sensing resistor Rcs1. The voltage across the sensing resistor can be used to represent at least partially the amount of current flowing through the source inductor. FIG. 9C is a diagram of an illustrative current detection circuit 180 in accordance with an embodiment. Input Ics_phx represents the current flowing through the sensing resistor of phase x.

As shown in FIG. 9C, current detection circuit 180 may include a comparator 184, a first multiplexing circuit 186, a second multiplexing circuit 188, a delay circuit 182, an adder circuit 190, a unit delay circuit 192, and a data converter (e.g., a digital-to-analog converter) 194. Comparator 184 may have a first (positive) input that receives input Ics_phx, a second (negative) input, and an output that controls multiplexer 186. Multiplexer 186 has a first (0) input configured to receive a "−F", a second (1) input configured to receive a "F", and an output at which either "−F" or "F" is routed through depending on the output of comparator 184. If the comparator output is low, then multiplexer 186 will pass through "−F". If the comparator output is high, then multiplexer 186 will pass through "1".

Multiplexer 188 has a first (0) input configured to receive a "0", a second (1) input configured to receive either a "−1" or "1" from the output of multiplexer 186, a control input that receives signals from delay circuit 182, and an output. Adder 190 has a first input connected to the output of multiplexer 188, an output on which a detected current level Idet_phx is provided, and also a second input that receives Idet_phx via unit delay component 192. Adder 190 connected in this feedback loop may serve as an integrator circuit. Digital-to-analog converter (DAC) 194 may receive the unit-delayed version of Idet_phx and may be configured to output an analog reference signal to the second (negative) input of comparator 184 via path 196.

Configured in this way, current Ics_phx can be checked at specific times based on the rising and falling edges of the PWM signals. Signal PWM_rising_edge_phx will be asserted at the rising edge of the PWM signal, whereas signal PWM_falling_edge_phx will be asserted at the falling edge of the PWM signal. For instance, the current can be checked right after the PWM rising edge to obtain the inductor valley current level (Ivalley). The delay of circuit 182 may be set to T1÷2 (see, e.g., FIG. 9B where Tdelay is set to half of T1) so that the current can be checked at around 50% of the PWM on time to obtain the average inductor current. The detected average current level is labeled as Idet in FIG. 9B. At specific times, Ics_phx can be compared with the reference signal provided by DAC 194. If the comparator output is high, the integrator will increase by one (since a "1" will be passed through from multiplexer 186). Otherwise, integrator will decrease by one (since a "−1" will be pass through from multiplexer 186).

Figure 9D:
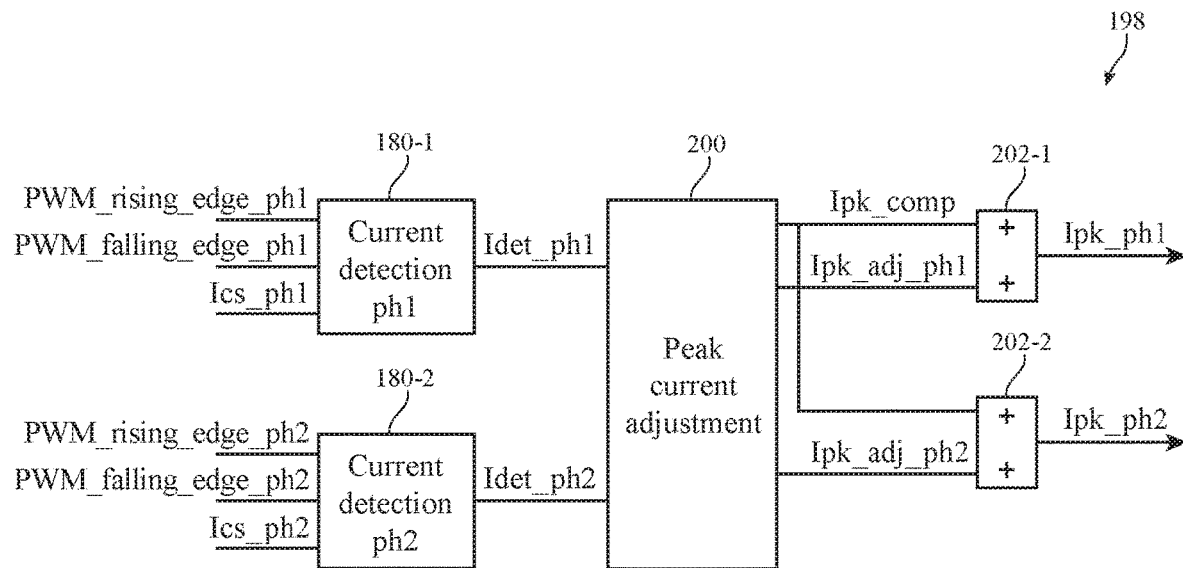
FIG. 9D is a diagram of illustrative peak current adjustment circuitry in accordance with an embodiment.

FIG. 9D is a diagram of illustrative peak current adjustment circuitry 198 for a dual-phase boost converter. Peak current adjustment circuitry 198 may be optionally implemented as part of controller 144. As shown in FIG. 9D, peak current adjustment circuitry 198 may include a first current detection circuit 180-1 associated with the first phase (ph1), a second current detection circuit 180-2 associated with the second phase (ph2), a peak current adjustment circuit 200, and adders 202-1 and 202-2 at the output. Current detection circuits 180-1 and 180-2 may be implemented using the structure illustrated in FIG. 9C. Peak current adjustment circuit 200 has a first input configured to receive detected average current Idet_ph1 from circuit 180-1, a second input configured to receive detected average current Idet_ph2 from circuit 180-2.

Based on the received detected average current levels of the two phases, peak adjustment circuit 200 may generate a first peak current adjustment amount Ipk_adj_ph1 for the first phase and a second peak current adjustment amount Ipk_adj_ph2 for the second phase. Peak current adjustment amounts Ipk_adj_ph1 and Ipk_adj_ph2 should be greater than or equal to equal. These current adjustment amounts may be added to a peak current reference signal Ipk_comp using adder circuits 202-1 and 202-2 to respectively generate the final peak current for the first phase (Ipk_ph1) and the final peak current for the second phase (Ipk_ph2). Peak current Ipk_ph1 limits the amount of current flowing through inductor L1, whereas peak current Ipk_ph2 limits the amount of current flowing through inductor L2.

Figure 9E:
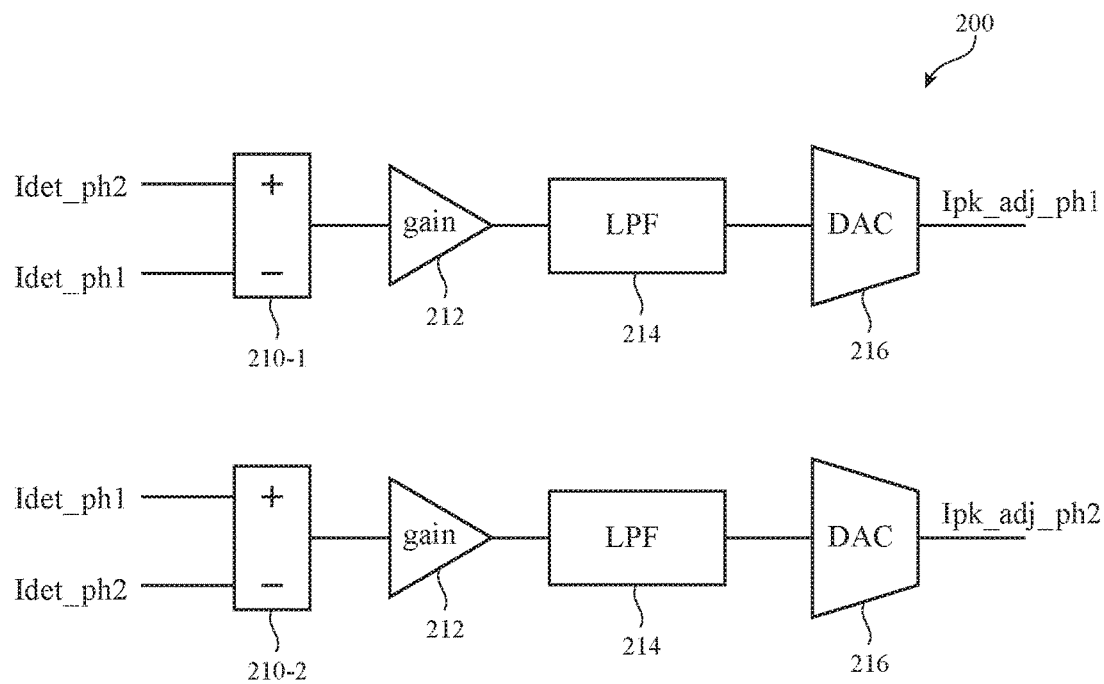
FIG. 9E is a diagram of illustrative peak current adjustment sub-circuits in accordance with an embodiment.

FIG. 9E is a diagram of illustrative peak current adjustment sub-circuits that may be included within peak current adjustment circuit 200. As shown in FIG. 9E, peak current adjustment circuit 200 may include a first subtraction circuit 210-1, a first gain stage 212, a first low-pass filter (LPF) 214, and a first digital-to-analog converter (DAC) 216 coupled together in a chain. Subtraction circuit 210-1 may have a first (positive) input configured to receive Idet_ph2 and a second (negative) input configured to receive Idet_ph1. Configured in this way, subtractor 210-1 will subtract Idet_ph1 from Idet_ph2, and the corresponding difference will be used to output Ipk_adj_ph1.

Similarly, peak current adjustment circuit 200 may further include a second subtraction circuit 210-2, a second gain stage 212, a second low-pass filter (LPF) 214, and a second DAC 216 coupled together in a chain. Subtraction circuit 210-2 may have a first (+) input configured to receive Idet_ph1 and a second (−) input configured to receive Idet_ph2. Configured in this way, subtractor 210-2 will subtract Idet_ph2 from Idet_ph1, and the corresponding difference will be used to output Ipk_adj_ph2.

Figure 9F:
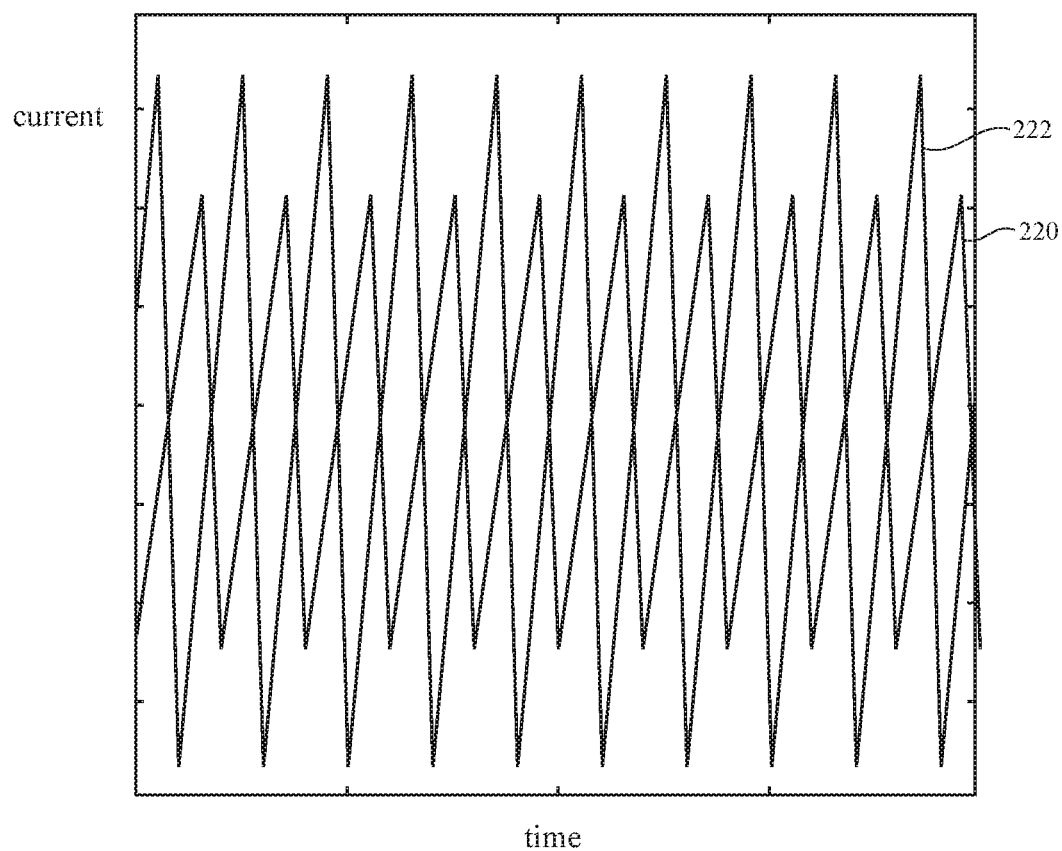
FIG. 9F is a plot showing how the average inductor current is balanced between the two phases of a boost converter in accordance with an embodiment.

FIG. 9F is a plot showing the results of using peak current adjustment circuitry 198 to adjust the peak currents for the different converter phases. Even when there is a large inductance mismatch between the two phases (e.g., an L1 of 39.6 uH versus an L2 of 26.4 uH as described above) and even if the peak-to-peak ripple of the lower inductance phase (see waveform 222) is 150% of the peak-to-peak ripple of the higher inductance phase (see waveform 220), the average inductor current is balanced between the two phases. By equalizing the average inductor current level of the two phases, the power loss mismatch for key components within the dual-phase boost converter is dramatically reduced.

Figure 10A:
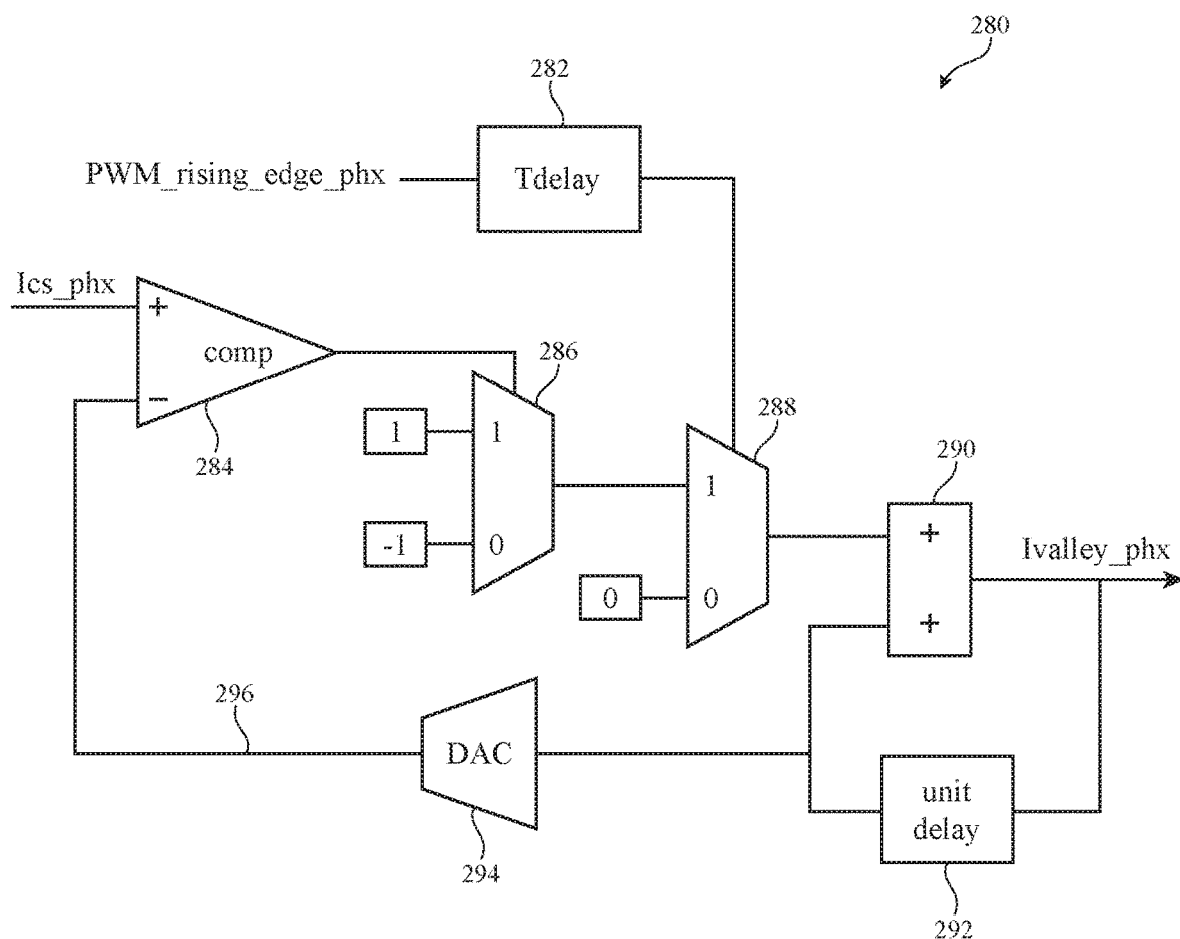
FIG. 10A is a diagram of an illustrative valley current detection circuit in accordance with an embodiment.

The embodiment described in connection with FIGS. 9B-9E where the average current level is detected is merely illustrative. In another suitable arrangement, a valley current detection scheme may be provided. FIG. 10A is a diagram of an illustrative current detection circuit 280 that senses inductor valley current for a dual-phase boost converter. Like above, input Ics_phx represents the current flowing through the sensing resistor of phase x. As shown in FIG. 10A, current detection circuit 280 may include a comparator 284, a first multiplexing circuit 286, a second multiplexing circuit 288, a delay circuit 282, an adder circuit 290, a unit delay circuit 292, and a DAC 294. Comparator 284 may have a first (positive) input that receives input Ics_phx, a second (negative) input, and an output that controls multiplexer 286. Multiplexer 286 has a first (0) input configured to receive a "4", a second (1) input configured to receive a "1", and an output at which either "−1" or "1" is routed through depending on the output of comparator 284. If the comparator output is low, then multiplexer 286 will pass through "−1". If the comparator output is high, then multiplexer 286 will pass through "1".

Multiplexer 288 has a first (0) input configured to receive a "0", a second (1) input configured to receive either a "−1" or "1" from the output of multiplexer 286, a control input that receives signals from delay circuit 282, and an output. Adder 290 has a first input connected to the output of multiplexer 288, an output on which a detected valley current level Ivalley_phx is provided, and also a second input that receives Ivalley_phx via unit delay component 292. Adder 290 connected in this feedback loop may serve as an integrator circuit. DAC 294 may receive the unit-delayed version of Ivalley_phx and may be configured to output an analog reference signal to the second (negative) input of comparator 284 via path 296.

Configured in this way, current Ics_phx can be checked at specific times based on the rising edges of the PWM signals. Signal PWM_rising_edge_phx will be asserted at the rising edge of the PWM signal. For instance, the current can be checked right after the PWM rising edge to obtain the inductor valley current level (Ivalley). At the rising edge of the PWM signal, the integrator may integrate the output of multiplexer 288, and the output of the integrator can be converted to an analog signal as the reference of comparator 284 using DAC 294. At specific times, Ics_phx can be compared with the reference signal provided by DAC 294. If the comparator output is high, the integrator will increase by one (since a "1" will be passed through from multiplexer 286). Otherwise, integrator will decrease by one (since a "−1" will be pass through from multiplexer 286).

Figure 10B:
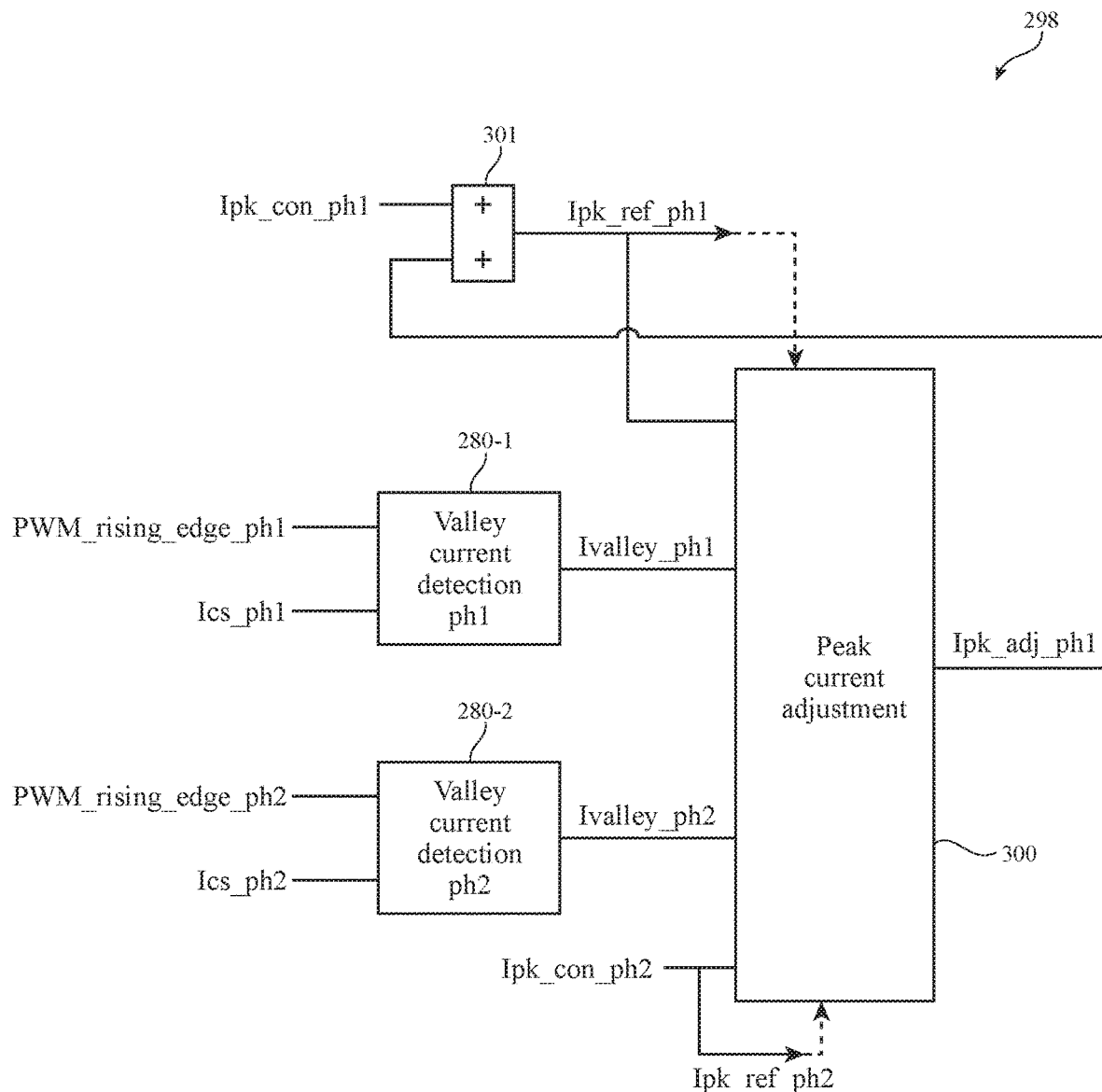
FIG. 10B is a diagram of illustrative peak current adjustment circuitry in accordance with an embodiment.

FIG. 10B is a diagram of illustrative peak current adjustment circuitry 298 that includes the valley current detection circuit of FIG. 10A. Peak current adjustment circuitry 298 may be optionally implemented as part of controller 144. As shown in FIG. 10B, peak current adjustment circuitry 298 may include a first current detection circuit 280-1 associated with the first phase (ph1), a second current detection circuit 280-2 associated with the second phase (ph2), a peak current adjustment circuit 300, and adder 301 at the output. Current detection circuits 280-1 and 280-2 may be implemented using the structure illustrated in FIG. 10A. Peak current adjustment circuit 300 has a first input configured to receive detected valley current Ivalley_ph1 from circuit 280-1, a second input configured to receive detected valley current Ivalley_ph2 from circuit 280-2.

Based on the received detected valley current levels of the two phases, peak adjustment circuit 300 may generate a peak current adjustment amount Ipk_adj_ph1 for the first phase. Adjustment value Ipk_adj_ph1 may be combined with a first peak current value determined by a compensator associated with the first phase (Ipk_con_ph1) using adder 301 to produce a first peak current reference Ipk_ref_ph1, which can be fed back into peak current adjustment circuit 300 as an input. Circuit 300 may further receive a second peak current value determined by a compensator associated with the second phase (Ipk_con_ph2), which may be used as a second peak current reference Ipk_ref_ph2.

Figure 10C:
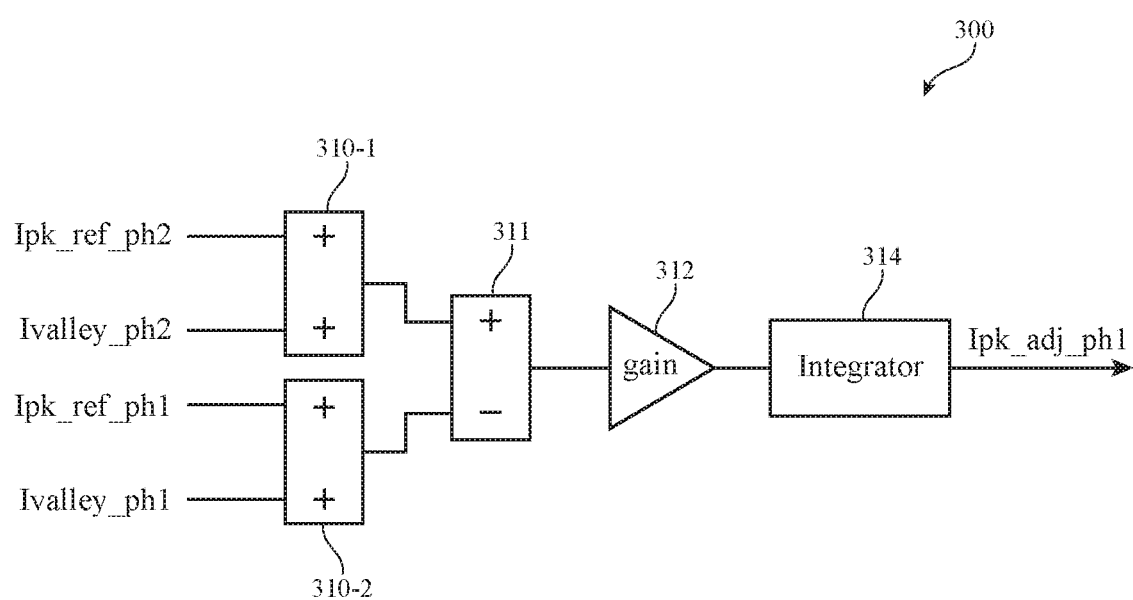
FIG. 10C is a diagram of an illustrative peak current adjustment circuit in accordance with an embodiment.

FIG. 10C is a diagram showing one suitable implementation of peak current adjustment circuit 300. As shown in FIG. 10C, peak current adjustment circuit 300 may include a first adder circuit 310-1, a second adder circuit 310-2, a subtraction circuit 311, a gain stage 312, and an integrator 314 coupled together in a chain. Adder circuit 310-1 may be configured to combine Ipk_ref_ph2 and Ivalley_ph2. Adder circuit 310-2 may be configured to combine Ipk_ref_ph1 and Ivalley_ph1. Subtraction circuit 311 may have a first (+) input configured to receive a sum from the output of adder 310-1, a second (−) input configured to receive a sum from the output of adder 310-2, and an output on which a corresponding difference is provided and subsequently fed to gain stage 312 for accumulation by integrator 314. The final integrated output serves as peak current adjustment amount Ipk_adj_ph1 for the first phase.

Configured in this way, Ipk_adj_ph1 can be expressed mathematically as follows:

$$Ipk\_adj\_ph1 = \int Gain * (Ipk\_ref\_ph2 + Ivalley\_ph2 - Ipk\_ref\_ph1 - Ivalley\_ph1) dt \quad (3)$$

This integration can be performed either in the digital domain or in the analog domain. By tracking the inductor valley current in this way, which can move up and down from cycle to cycle, the peak current is not affected much since the peak current adjustment mechanism integrates error with a gain factor. The integrator 314 acts like a low-pass filter that gradually adjusts the peak current over multiple switching cycles. Operated in this way, the average inductor current between the two phases will also be balanced even when there is a large inductance mismatch (see, e.g., the resulting waveforms in FIG. 9F). By equalizing the average inductor current level of the two phases, the power loss mismatch for key components within the dual-phase boost converter is dramatically reduced.

Figure 11A:
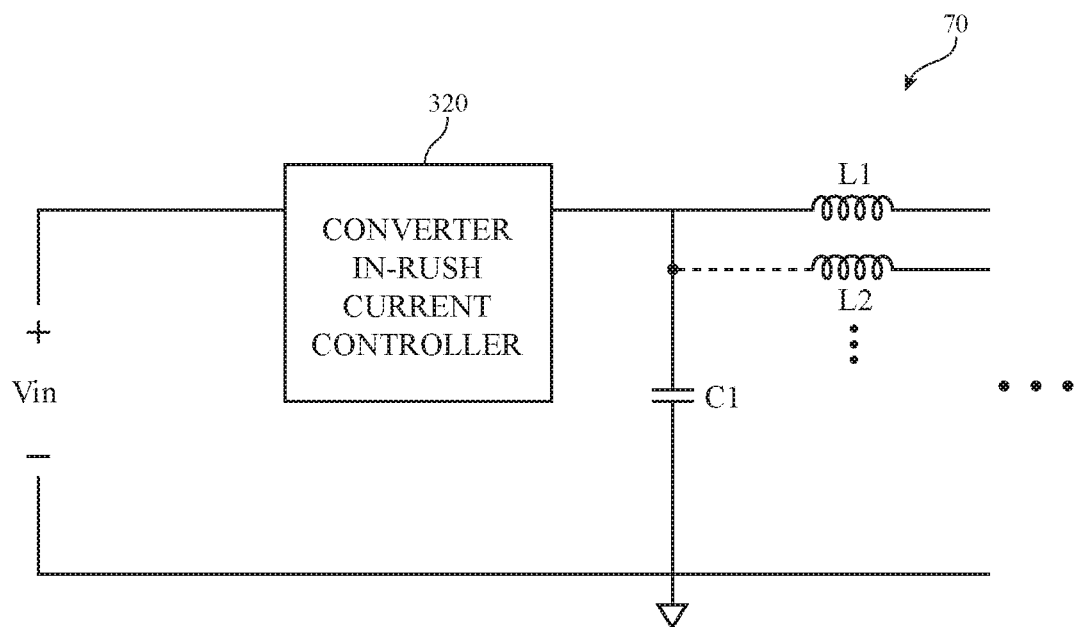
FIG. 11A is a diagram showing how a DC-to-DC converter may be provided with an in-rush current controller in accordance with an embodiment.

Another potential reliability issue associated with the boost converter is if there is a fault or unintended short near the input of the boost converter. In such scenarios, a large current might flow into the input of the boost converter, which can damage key electrical components within the boost converter. To help mitigate this potential current surge, a boost converter may be provided with a current control circuit such as in-rush current controller 320 coupled at the input of boost convertor 70 (see, e.g., FIG. 11A). As shown in FIG. 11A, in-rush current controller 320 can be coupled between the input port at which input voltage Vin is received and input capacitor C1. In-rush current controller 320 may be used in a boost converter 70 with any number of phases (e.g., for a single-phase boost converter, a dual-phase boost converter, or a generic N-phase boost converter where N>2).

Figure 11B:
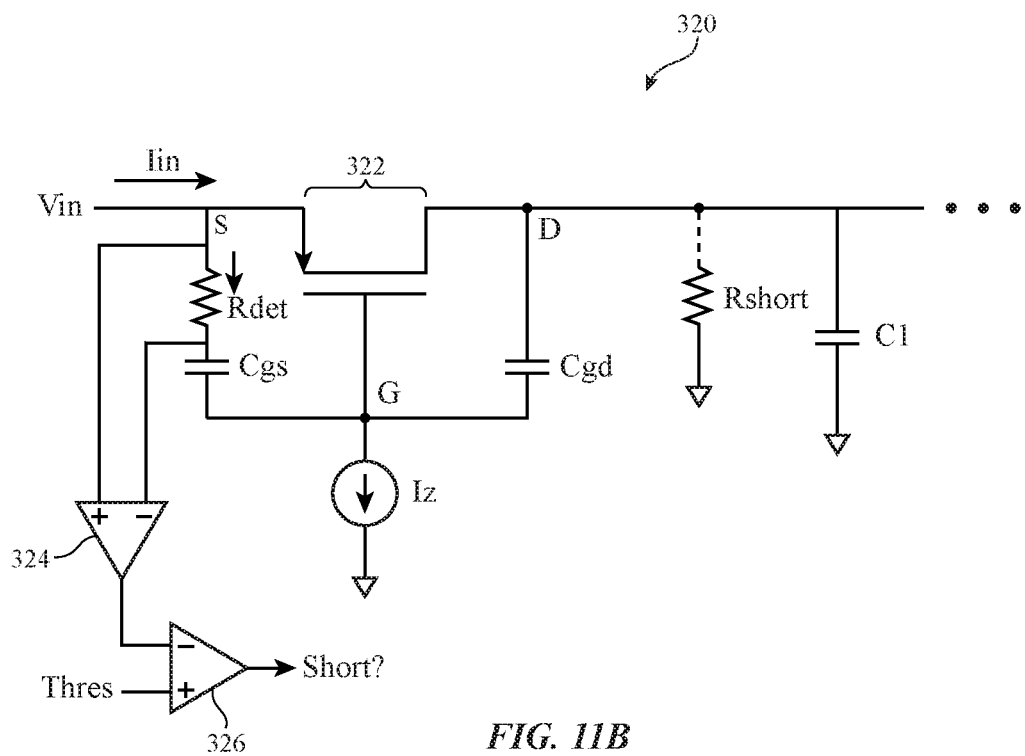
FIG. 11B is a diagram of an illustrative in-rush current controller in accordance with an embodiment.

FIG. 11B is a circuit diagram showing one suitable implementation of in-rush current controller 320. As shown in FIG. 11B, in-rush current controller 320 may include a transistor 322. Transistor 322 (e.g., an n-channel MOSFET device) has a gate terminal that is connected to current source Iz, has a gate-to-drain parasitic capacitance Cgd, and a gate-to-source parasitic capacitance Cgs. The potential faulty short is represented as short circuit resistance Rshort. Without in-rush current controller 320, a large input current Iin (e.g., 1-2 A or more) can inadvertently flow through the input into the short circuit path.

In particular, in-rush controller 320 may be provided with a detection resistor Rdet coupled between the gate and source terminals of transistor 322. While the gate-to-source voltage Vgs across transistor 322 is ramped up to turn on transistor 322, a small amount of current could flow through resistor Rdet depending on whether a short fault is present, which will present a voltage differential to a first in-rush comparator 324. The voltage differential may be compared to a predetermined threshold (Thres) using a second in-rush comparator 326 to determine whether a short actually exists. For example, when there is no short, comparator 324 may detect a 0-40 mV differential, which is less than an exemplary predetermined threshold of 50 mV. If there is a short, however, comparator 324 may detect a 100 mV differential, which might exceed 50 mV predetermined threshold. Configured in this way, in-rush controller 320 can be used to detect a short fault within boost converter 70, and any suitable action can be taken in response to detecting such defect to help prevent irreversible damage.

The example of FIGS. 11A and 11B in which in-rush current controller 320 is connected at the input of boost converter 70 is merely illustrative. If desired, the in-rush controller might also be formed at the output of boost converter 70 or at any suitable intermediate location within boost converter 70 to help reduce the risk of damage caused by inadvertent short faults.

The foregoing is merely illustrative and various modifications can be made to the described embodiments. The foregoing embodiments may be implemented individually or in any combination.

What is claimed is:

1. A converter circuit configured to convert a source of direct current from a first voltage level to a second voltage level that is different than the first voltage level, the converter circuit comprising:
   an input port configured to receive an input voltage at the first voltage level;
   an output port at which an output voltage at the second voltage level is generated;
   a first inductor having a first terminal coupled to the input port and a second terminal coupled to the output port;
   a first switch having a first terminal coupled to the first inductor and a second terminal coupled to a ground power supply line;
   a first current sensing resistor connected in series with the first switch; and
   a controller configured to receive a first sensing signal from the first current sensing resistor and to selectively turn off the first switch in response to detecting that the amount of current flowing through the first switch exceeds a predetermined peak current level.

2. The converter circuit of claim 1, further comprising:
a second inductor having a first terminal coupled to the input port and a second terminal coupled to the output port;
a second switch having a first terminal coupled to the second inductor and a second terminal coupled to the ground power supply line; and
a second current sensing resistor connected in series with the second switch, wherein the converter circuit is operable in a single-phase mode during which only the first switch is turned on and in a dual-phase mode during which both the first and second switches are turned on, and wherein the controller is further configured to raise the output voltage when down-transitioning from the dual-phase mode to the single-phase mode to compensate for a voltage dip during the down transition.

3. The converter circuit of claim 2, wherein the controller initiates the down transition in response to an externally-supplied brightness setting falling below a predetermined threshold.

4. The converter circuit of claim 2, wherein the controller is further configured to ramp up the amount of current flowing through the second switch when up-transitioning from the single-phase mode to the dual-phase mode to reduce a voltage overshoot during the up transition.

5. The converter circuit of claim 4, wherein the controller initiates the up transition in response to an externally-supplied brightness setting exceeding a predetermined threshold.

6. The converter circuit of claim 1, further comprising:
a second switch coupled in parallel with the first switch, wherein the first and second switches are turned on at different times using the controller.

7. The converter circuit of claim 1, further comprising:
a second inductor having a first terminal coupled to the input port and a second terminal coupled to the output port;
a second switch having a first terminal coupled to the second inductor and a second terminal coupled to the ground power supply line; and
a second current sensing resistor connected in series with the second switch, wherein the controller controls the first switch by outputting a first gate driver signal and controls the second switch by outputting a second gate driver signal, and wherein the second gate driver signal is delayed with respect to the first gate driver signal by a phase offset amount.

8. The converter circuit of claim 7, wherein the phase offset amount by which the second gate driver signal is delayed with respect to the first gate driver signal is a function of a total number of phase modes supported by the converter circuit.

9. A converter circuit configured to convert a source of direct current from a first voltage level to a second voltage level that is different than the first voltage level, the converter circuit comprising:
an input port configured to receive an input voltage at the first voltage level;
an output port at which an output voltage at the second voltage level is generated;
a first inductor having a first terminal coupled to the input port and a second terminal coupled to the output port;
a first switch and a first current sensing resistor coupled in series between the first inductor and a ground line;
a second inductor having a first terminal coupled to the input port and a second terminal coupled to the output port;
a second switch and a second current sensing resistor coupled in series between the second inductor and the ground line, wherein the converter circuit is operable in a single-phase mode during which only the first switch is turned on and in a dual-phase mode during which both the first and second switches are turn on; and
a controller configured to balance the average amount of current flowing through the first and second switches during the dual-phase mode to reduce power loss in the converter circuit.

10. The converter circuit of claim 9, wherein the controller comprises peak current adjustment circuitry configured to adjust the amount of current flowing through at least one of the first switch and the second switch.

11. The converter circuit of claim 10, wherein the peak current adjustment circuitry comprises:
a first current detection circuit configured to receive a first sensing signal from the first current sensing resistor and to output a first amount of detected current;
a second current detection circuit configured to receive a second sensing signal from the second current sensing resistor and to output a second amount of detected current; and
a peak current adjustment circuit configured to receive the first amount of detected current and the second amount of detected current and to output a first adjustment signal for adjusting the amount of current flowing through the first switch and a second adjustment signal for adjusting the amount of current flowing through the second switch.

12. The converter circuit of claim 11, wherein the first current detection circuit comprises:
an integrator configured to output the first amount of detected current; and
a comparator configured to receive the first sensing signal, wherein the comparator causes the integrator to increment in response to determining that the first sensing signal exceeds a reference level and to decrement in response to determining that the first sensing signal is below the reference level.

13. The converter circuit of claim 12, wherein the first current detection circuit further comprises one or more multiplexers interposed between the comparator and the integrator.

14. The converter circuit of claim 11, wherein the peak adjustment circuit comprises:
a first subtraction circuit configured to compute a first difference by subtracting the first amount of detected current from the second amount of detected current;
a first gain stage configured to receive the first difference from the first subtraction circuit;
a first low-pass filter configured to receive signals from the first gain stage; and
a first digital-to-analog converter configured to receive signals from the first low-pass filter and to output the first adjustment signal.

15. The converter circuit of claim 14, wherein the peak adjustment circuit further comprises:
a second subtraction circuit configured to compute a second difference by subtracting the second amount of detected current from the first amount of detected current;
a second gain stage configured to receive the second difference from the second subtraction circuit;

a second low-pass filter configured to receive signals from the second gain stage; and a second digital-to-analog converter configured to receive signals from the second low-pass filter and to output the second adjustment signal.

16. The converter circuit of claim 10, wherein the peak current adjustment circuitry comprises:

a first valley current detection circuit configured to receive a first sensing signal from the first current sensing resistor and to output a first amount of detected valley current; and a second valley current detection circuit configured to receive a second sensing signal from the second current sensing resistor and to output a second amount of detected valley current, wherein the first and second amounts of detected valley current are senses at rising edges of a pulse-width modulated signal controlling the converter circuit.

17. The converter circuit of claim 16, wherein the peak current adjustment circuitry further comprises:

a peak current adjustment circuit configured to receive the first amount of detected valley current and the second amount of detected valley current and to output an adjustment signal for adjusting the amount of current flowing through the first switch.

18. The converter circuit of claim 17, wherein the first valley current detection circuit comprises:

an integrator configured to output the first amount of detected valley current; and a comparator configured to receive the first sensing signal, wherein the comparator causes the integrator to increment in response to determining that the first sensing signal exceeds a dynamically changing reference level and to decrement in response to determining that the first sensing signal is below the dynamically changing reference level.

19. The converter circuit of claim 18, wherein the peak adjustment circuit comprises:

a first adder circuit configured to receive the first amount of detected valley current and a first peak reference current;

a second adder circuit configured to receive the second amount of detected valley current and a second peak reference current;

a subtraction circuit having a first input coupled to the first adder circuit, a second input coupled to the second adder circuit, and an output at which a corresponding difference is computed;

a gain stage configured to receive the difference from the subtraction circuit; and an additional integrator configured to receive signals from the gain stage to output the adjustment signal.

20. A converter circuit configured to convert a source of direct current from a first voltage level to a second voltage level that is different than the first voltage level, the converter circuit comprising:

an input port configured to receive an input voltage at the first voltage level;

an output port on which an output voltage at the second voltage level is generated;

an inductor having a first terminal coupled to the input port and a second terminal coupled to the output port; and an in-rush current controller interposed between the input port and the inductor, wherein the in-rush current controller comprises:

a transistor having a drain terminal, a gate terminal, and a source terminal, wherein the source terminal is connected to the input port, and wherein the drain terminal is connected to the inductor;

a detection resistor coupled between the gate terminal and source terminal of the transistor; and comparison circuitry configured to receive a sensing signal from the detection resistor to determine whether a short fault is present in the converter circuit.

* * * * *